US009263758B2

(12) United States Patent
Larsen et al.

(10) Patent No.: US 9,263,758 B2
(45) Date of Patent: Feb. 16, 2016

(54) REVERSIBLE SOLID OXIDE FUEL CELL STACK AND METHOD FOR PREPARING SAME

(75) Inventors: Peter Halvor Larsen, Roskilde (DK); Anders Smith, Birkeroed (DK); Mogens Mogensen, Lynge (DK); Soeren Linderoth, Roskilde (DK); Peter Vang Hendriksen, Hileroed (DK)

(73) Assignee: Technical University of Denmark, Kgs. Lyngby (DK)

( * ) Notice: Subject to any disclaimer, the term of this patent is extended or adjusted under 35 U.S.C. 154(b) by 2067 days.

(21) Appl. No.: 12/065,357

(22) PCT Filed: Aug. 31, 2006

(86) PCT No.: PCT/EP2006/008537
§ 371 (c)(1),
(2), (4) Date: Apr. 23, 2008

(87) PCT Pub. No.: WO2007/025762
PCT Pub. Date: Mar. 8, 2007

(65) Prior Publication Data
US 2008/0248361 A1    Oct. 9, 2008

(30) Foreign Application Priority Data
Aug. 31, 2005  (EP) ..................................... 05018912

(51) Int. Cl.
*H01M 8/24*   (2006.01)
*H01M 4/86*   (2006.01)
(Continued)

(52) U.S. Cl.
CPC ............ *H01M 8/2435* (2013.01); *H01M 4/861* (2013.01); *H01M 4/8885* (2013.01);
(Continued)

(58) Field of Classification Search
CPC . H01M 4/861; H01M 4/8885; H01M 4/9033; H01M 4/905; H01M 2008/1293; H01M 8/0276; H01M 8/2435
See application file for complete search history.

(56) References Cited

U.S. PATENT DOCUMENTS

| 3,023,492 A | 3/1962 | Bristow |
| 4,209,147 A | 6/1980 | Jones, Jr. |

(Continued)

FOREIGN PATENT DOCUMENTS

| CA | 2440288 | 3/2004 |
| CA | 2596173 | 8/2006 |

(Continued)

OTHER PUBLICATIONS

Matus, Y. et al., "Metal-supported solid oxide fuel cell membranes for rapid thermal cycling", Solid State IOnics (2006) 176:443-449.*

(Continued)

*Primary Examiner* — Barbara Gilliam
*Assistant Examiner* — Angela Martin
(74) *Attorney, Agent, or Firm* — Michael Best & Friedrich LLP

(57) ABSTRACT

A reversible SOFC monolithic stack is provided which comprises: 1) a first component which comprises at least one porous metal containing layer (1) with a combined electrolyte and sealing layer on the porous metal containing layer (1); wherein the at least one porous metal containing layer (1) hosts an electrode; 2) a second component comprising at least one porous metal containing layer (1) with a combined interconnect and sealing layer on the porous metal containing layer; wherein the at least one porous metal containing layers hosts an electrode. Further provided is a method for preparing a reversible solid oxide fuel cell stack. The obtained solid oxide fuel cell stack has improved mechanical stability and high electrical performance, while the process for obtaining same is cost effective.

28 Claims, 14 Drawing Sheets

(51) Int. Cl.
*H01M 4/88* (2006.01)
*H01M 4/90* (2006.01)
*H01M 8/02* (2006.01)
*H01M 8/12* (2006.01)

(52) U.S. Cl.
CPC ............ *H01M 4/905* (2013.01); *H01M 4/9033* (2013.01); *H01M 8/0276* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 4,702,971 A | 10/1987 | Isenberg | |
| 4,957,673 A | 9/1990 | Schroeder et al. | |
| 5,021,304 A | 6/1991 | Ruka et al. | |
| 5,058,799 A | 10/1991 | Zsamboky | |
| 5,064,734 A | 11/1991 | Nazmy et al. | |
| 5,162,167 A | 11/1992 | Minh et al. | |
| 5,358,735 A | 10/1994 | Kawasaki et al. | |
| 5,368,951 A | 11/1994 | Shiratori et al. | |
| 5,589,285 A * | 12/1996 | Cable ................ | H01M 8/2425 429/304 |
| 5,670,270 A | 9/1997 | Wallin et al. | |
| 5,702,837 A | 12/1997 | Xue | |
| 5,788,788 A | 8/1998 | Minh | |
| 5,803,934 A | 9/1998 | Carter | |
| 5,846,664 A | 12/1998 | Third et al. | |
| 5,908,713 A | 6/1999 | Ruka et al. | |
| 6,017,647 A | 1/2000 | Wallin | |
| 6,048,636 A | 4/2000 | Naoumidis et al. | |
| 6,099,985 A | 8/2000 | Elangovan et al. | |
| 6,191,510 B1 | 2/2001 | Landin et al. | |
| 6,232,009 B1 | 5/2001 | Batawi | |
| 6,248,468 B1 | 6/2001 | Ruka et al. | |
| 6,280,868 B1 | 8/2001 | Badwal et al. | |
| 6,458,170 B1 | 10/2002 | Visco et al. | |
| 6,479,183 B2 | 11/2002 | Tsukuda et al. | |
| 6,592,787 B2 | 7/2003 | Pickrell et al. | |
| 6,605,316 B1 | 8/2003 | Visco et al. | |
| 6,682,842 B1 | 1/2004 | Visco et al. | |
| 6,783,880 B2 | 8/2004 | Christiansen | |
| 6,811,913 B2 | 11/2004 | Ruhl | |
| 6,824,907 B2 * | 11/2004 | Sarkar et al. ................ | 429/452 |
| 6,843,960 B2 | 1/2005 | Krumpelt et al. | |
| 6,844,099 B1 | 1/2005 | Gorte et al. | |
| 6,878,651 B2 | 4/2005 | Crosbie | |
| 6,936,217 B2 | 8/2005 | Quadadakkers et al. | |
| 6,958,196 B2 | 10/2005 | Gorte et al. | |
| 7,351,488 B2 | 4/2008 | Visco et al. | |
| 7,397,142 B1 | 7/2008 | Cooper | |
| 7,566,513 B2 * | 7/2009 | Katagiri ................ | H01M 4/861 429/509 |
| 7,829,213 B2 | 11/2010 | Jacobson et al. | |
| 2001/0029231 A1 | 10/2001 | Gorte et al. | |
| 2002/0045090 A1 | 4/2002 | Oyanagi et al. | |
| 2002/0048699 A1 | 4/2002 | Steele et al. | |
| 2002/0122967 A1 | 9/2002 | Gorina et al. | |
| 2002/0127455 A1 | 9/2002 | Pham et al. | |
| 2002/0182468 A1 | 12/2002 | Janousek et al. | |
| 2003/0015431 A1 | 1/2003 | Barker et al. | |
| 2003/0035989 A1 | 2/2003 | Gorte et al. | |
| 2003/0040420 A1 | 2/2003 | Larsen et al. | |
| 2003/0059335 A1 | 3/2003 | Quadadakkers et al. | |
| 2003/0059668 A1 * | 3/2003 | Visco et al. ................ | 429/44 |
| 2003/0082434 A1 | 5/2003 | Wang et al. | |
| 2003/0134169 A1 * | 7/2003 | Sarkar et al. ................ | 429/31 |
| 2003/0134171 A1 * | 7/2003 | Sarkar et al. ................ | 429/31 |
| 2003/0145525 A1 | 8/2003 | Rosenflanz | |
| 2003/0165726 A1 | 9/2003 | Robert et al. | |
| 2003/0178307 A1 | 9/2003 | Sarkar | |
| 2003/0186101 A1 | 10/2003 | Christansen et al. | |
| 2003/0224233 A1 | 12/2003 | Kohler et al. | |
| 2003/0224234 A1 | 12/2003 | Steele et al. | |
| 2003/0231973 A1 | 12/2003 | Krumpelt et al. | |
| 2003/0232230 A1 | 12/2003 | Carter et al. | |
| 2003/0235752 A1 | 12/2003 | England et al. | |
| 2004/0033405 A1 | 2/2004 | Barnett et al. | |
| 2004/0043269 A1 * | 3/2004 | Taniguchi et al. ............. | 429/30 |
| 2004/0053101 A1 | 3/2004 | Chartier et al. | |
| 2004/0060967 A1 | 4/2004 | Yang et al. | |
| 2004/0115503 A1 | 6/2004 | Jacobson et al. | |
| 2004/0150366 A1 | 8/2004 | Ferrall et al. | |
| 2004/0169064 A1 | 9/2004 | Rinne et al. | |
| 2004/0173666 A1 | 9/2004 | Fukunaga et al. | |
| 2004/0183055 A1 | 9/2004 | Chartier et al. | |
| 2004/0209147 A1 | 10/2004 | Finkenwirth et al. | |
| 2005/0064220 A1 | 3/2005 | Hasz | |
| 2005/0089739 A1 | 4/2005 | Seccombe et al. | |
| 2005/0181253 A1 | 8/2005 | Finnerty et al. | |
| 2005/0244693 A1 * | 11/2005 | Strutt et al. ................ | 429/32 |
| 2006/0024547 A1 | 2/2006 | Waldbillig et al. | |
| 2006/0121334 A1 * | 6/2006 | Finkenwirth et al. ......... | 429/44 |
| 2006/0127725 A9 * | 6/2006 | Sarkar et al. ................ | 429/31 |
| 2006/0147782 A1 | 7/2006 | Reisdorf et al. | |
| 2006/0234100 A1 | 10/2006 | Day et al. | |
| 2006/0257703 A1 | 11/2006 | Qi et al. | |
| 2006/0269812 A1 * | 11/2006 | Lemkey ................ | 429/30 |
| 2006/0280998 A1 | 12/2006 | Ying et al. | |
| 2007/0009784 A1 * | 1/2007 | Pal et al. ................ | 429/45 |
| 2007/0040003 A1 | 2/2007 | Rinne et al. | |
| 2007/0269701 A1 | 11/2007 | Larsen et al. | |
| 2008/0096079 A1 | 4/2008 | Linderoth et al. | |
| 2008/0118635 A1 | 5/2008 | Larsen | |
| 2008/0124602 A1 | 5/2008 | Larsen et al. | |
| 2008/0142148 A1 | 6/2008 | Nielsen et al. | |
| 2008/0166618 A1 | 7/2008 | Larsen et al. | |
| 2009/0148743 A1 | 6/2009 | Day et al. | |

FOREIGN PATENT DOCUMENTS

| | | | |
|---|---|---|---|
| CA | 2537375 | 9/2006 | |
| CN | 1409427 | 4/2003 | |
| CN | 1997229 | 7/2007 | |
| DE | 4237602 | 5/1994 | |
| DE | 19650704 | 6/1998 | |
| DE | 19710345 | 1/1999 | |
| DE | 19836132 | 2/2000 | |
| EP | 0446680 | 9/1991 | |
| EP | 1065020 | 1/2001 | |
| EP | 1255318 | 11/2002 | |
| EP | 1306920 | 5/2003 | |
| EP | 1318560 | 6/2003 | |
| EP | 1383195 | 1/2004 | |
| EP | 1699104 | 9/2006 | |
| GB | 1313795 | 4/1973 | |
| GB | 2400723 | 10/2004 | |
| JP | 02-019406 | 1/1990 | |
| JP | 08-222249 | 8/1996 | |
| JP | 09-050812 | 2/1997 | |
| JP | 9-274921 | 10/1997 | |
| JP | 2001335388 | 12/2001 | |
| JP | 2002-329508 | 11/2002 | |
| JP | 2003-522384 | 7/2003 | |
| JP | 2003-528979 | 9/2003 | |
| JP | 2003-282068 | 10/2003 | |
| JP | 2003-331856 | 11/2003 | |
| JP | 2004-119108 | 4/2004 | |
| JP | 2004152585 | 5/2004 | |
| JP | 2004319286 | 11/2004 | |
| JP | 2005-166483 A * | 6/2005 | ............. H01M 4/86 |
| JP | 2006-049248 | 2/2006 | |
| JP | 2006-134611 | 5/2006 | |
| JP | 2006-321706 | 11/2006 | |
| JP | 2008-130568 | 6/2008 | |
| KR | 10-0464607 | 1/2005 | |
| WO | WO 92/15122 | 9/1992 | |
| WO | WO 98/49738 | 11/1998 | |
| WO | WO 99/56899 | 11/1999 | |
| WO | 01/57945 | 8/2001 | |
| WO | 01/72456 | 10/2001 | |
| WO | WO 02/09116 | 1/2002 | |
| WO | WO 02/45198 | 6/2002 | |
| WO | WO 02/073729 | 9/2002 | |

(56) References Cited

FOREIGN PATENT DOCUMENTS

| WO | WO 03/036739 | 5/2003 |
|---|---|---|
| WO | WO 03/069705 | 8/2003 |
| WO | WO 03/075382 | 9/2003 |
| WO | WO 03/105252 | 12/2003 |
| WO | WO 2004/001885 | 12/2003 |
| WO | WO 2004/013925 | 2/2004 |
| WO | WO 2004/030130 | 4/2004 |
| WO | WO 2004/030133 | 4/2004 |
| WO | WO 2004/079033 | 9/2004 |
| WO | WO 2005/122300 | 12/2005 |
| WO | WO 2006/069753 | 7/2006 |
| WO | WO 2006/074932 | 7/2006 |
| WO | WO 2006/079558 | 8/2006 |
| WO | WO 2006/082057 | 8/2006 |

OTHER PUBLICATIONS

United States Patent Office Notice of Allowance for U.S. Appl. No. 11/813,074 dated Apr. 15, 2011 (2 pages).
Donald, I.W. "Preparation, properties and chemistry of glass and glass-ceramic-to-metal seals and coatings," J. Mat. Sci. (1993) 28:2841-2886.
Dyck, C.R. et al., "Synthesis and characterization of $Gd_{(1-x)}Sr_xCo_{(1-y)}Fe_yO_{(3-\delta)}$ as a cathode material for intermediate temperature solid oxide fuel cells," Mat. Res. Soc. Symp. Proc. (2004) 801:113-118.
Gut, B. et al., "Anode supported PEN for SOFC. Pressed substrates for spray pyrolysed and co-sintered electrolyte; redox stability and alternative anode," Jahresbericht (2001) 1-6.
Kim, J.H. et al., "Fabrication and characteristics of anode-supported flat-tube solid oxide fuel cell," J. Power Sources (2003) 122(2):138-143.
KlemensØ, T. et al., "The mechanism behind redox instability of anodes in high-temperature SOFCs," Electrochemical Society Journal (2005) 152(11):A2186-A2192.
Matus, Y. et al., "Metal-supported solid oxide fuel cell membranes for rapid thermal cycling," Solid State Ionics (2005) 176:443-449.
Nadler, J.H. et al., "Oxide reduction and sintering of Fe—Cr alloy honeycombs," J. Mat. Research (2003) 18(8):1787-1794.
Xia, C. et al., "Functionally graded cathodes for honeycomb solid oxide fuel cells," Electrochem. Solid-State Letters (2002) 5(10):A217-A220.
Young, R.C. et al., "Symposium BB: Materials and Technologies for a Hydrogen Economy," Materials Research Society Symposium Proceedings Series (Nov. 30, 2003) pp. 709-717.
Zhang, Y. et al., "Redox cycling of Ni—YSZ anode investigated by TPR technique," Solid State Ionics (2005) 176:2193-2199.
International Search Report from International Searching Authority for PCT/EP2006/008537 dated Aug. 8, 2007 (3 pages).
United States Patent Office Action for U.S. Appl. No. 11/8130,74 dated Jan. 10, 2011 (13 pages).
United States Patent Office Action for U.S. Appl. No. 11/815,025 dated Jan. 26, 2011 (5 pages).
United States Patent Office Action for U.S. Appl. No. 11/944,133 dated Jun. 22, 2011 (14 pages).
United States Patent Office Action for U.S. Appl. No. 11/813,798 dated Jun. 28, 2011 (9 pages).
United States Patent Office Action for U.S. Appl. No. 11/813,074 dated May 19, 2010 (11 pages).
United States Patent Office Action for U.S. Appl. No. 11/815,025 dated May 26, 2010 (7 pages).
European Patent Office Search Report for European Application No. 062024339 dated Feb. 2, 2007 (2 pages).
International Search Report and Written Opinion from International Searching Authority for PCT/EP2005/013968 dated Mar. 28, 2006 (10 pages).
International Preliminary Report on Patentability from International Searching Authority for PCT/EP2005/013968 dated Mar. 30, 2007 (10 pages).
International Search Report and Written Opinion from International Searching Authority for PCT/EP2006/000229 dated Mar. 15, 2006 (9 pages).
International Search Report and Written Opinion from International Searching Authority for PCT/EP2006/000920 dated Sep. 22, 2006 (10 pages).
International Search Report and Written Opinion from International Searching Authority for PCT/EP2006/000813 dated Mar. 29, 2006 (10 pages).
International Preliminary Report on Patentability from International Searching Authority for PCT/EP2006/000813 dated May 18, 2007 (10 pages).
International Search Report and Written Opinion from International Searching Authority for PCT/DK2005/000379 dated Dec. 16, 2005 (14 pages).
United States Office Action for U.S. Appl. No. 11/814,356 dated May 1, 2008 (7 pages).
United States Office Action for U.S. Appl. No. 11/570,320 dated May 26, 2009 (15 pages).
Notice of Allowability with Office Action for U.S. Appl. No. 11/814,356 dated Jul. 6, 2009 (7 pages).
United States Office Action for U.S. Appl. No. 11/814,356 dated Jan. 26, 2009 (7 pages).
Han, M-F. et al., "Manufacturing processes of solid oxide fuel cell," China Academic Journal Electronic Publishing House (2001) 10:1195-1198.
United States Patent Office Notice of Allowance for U.S. Appl. No. 11/813,798 dated Aug. 5, 2011 (4 pages).
United States Patent Office Action for U.S. Appl. No. 11/815,025 dated Aug. 11, 2011 (7 pages).
United States Patent Office Action for U.S. Appl. No. 11/944,133 dated Nov. 2, 2011 (14 pages).
United States Patent Office Action for U.S. Appl. No. 13/559,937 dated Dec. 13, 2012 (7 pages).
United States Patent Office Action for U.S. Appl. No. 11/944,133 dated Aug. 17, 2012 (16 pages).
Grosjean A et al.: "Reactivity and diffusion between La0.8Sr0.2MnO3 and ZrO2 at interfaces in SOFC cores by TEM analyses on FIB samples", Solid State Ionics, vol. 177, No. 19-25, Oct. 15, 2006, pp. 1977-1980.
United States Patent Office Action for U.S. Appl. No. 13/559,937 dated Jun. 14, 2013 (7 pages).
United States Patent Office Final Rejection for U.S. Appl. No. 11/944,133 dated Mar. 4, 2013 (15 pages).
United States Patent Office Action for U.S. Appl. No. 11/944,133 dated Sep. 12, 2013 (17 pages).
United States Patent Office Interview Summary for U.S. Appl. No. 11/944,133 dated Dec. 20, 2013 (3 pages).
United States Patent Office Notice of Allowance for U.S. Appl. No. 11/944,133 dated Mar. 12, 2014 (7 pages).

* cited by examiner

1

1

4

A

B

REVERSIBLE SOLID OXIDE FUEL CELL STACK AND METHOD FOR PREPARING SAME

CROSS-REFERENCE TO RELATED APPLICATIONS

This patent application is a national stage filing under 35 U.S.C. 371 of International Application No. PCT/EP2006/008537, filed Aug. 31, 2006, which claims foreign priority to European Patent Application No. 05018912.5 filed Aug. 31, 2005, the disclosures of which are incorporated by reference herein in their entireties. Priority to each application is hereby claimed.

TECHNICAL FIELD

The present invention relates to a reversible solid oxide fuel cell stack and a method for preparing same.

BACKGROUND ART

Solid oxide fuel cells (SOFC's) are well known in the art and come in various designs. Typical configurations include a flat plate design and a tubular design, wherein an electrolyte layer is sandwiched between two electrodes. During operation, usually at a temperature from 500° C. to 1100° C., one electrode is in contact with oxygen or air and the other electrode is in contact with a fuel gas.

Several properties are required for the SOFC's, such as high conductivity, a large area of electrochemically active sites at the electrode/electrolyte interface, chemical and physical stability over a wide range of fuel atmospheres, and minimal microstructural changes with operating time, since such changes are often accompanied by deterioration of electrical performance.

Under typical operating conditions, a single cell produces less than 1 volt. To obtain high voltage and power from the SOFC's, it is therefore necessary to stack many cells together.

The most common manufacturing method for SOFC planar stacks comprises the manufacture of single cells. The cells are subsequently stacked together with interconnects, current collectors, contact layers and seals. After assembly the stacks are consolidated/sealed by heat treatment under a vertical load, to ensure sealing as well as electrical contact between the components. The mechanical/electrical coherence of the stack during operation is ensured by applying a constant vertical load (using, e.g., a yoke).

The cells are most commonly manufactured by the use of wet powder processing techniques which comprise tape-casting of the support component (typically the electrolyte or anode). The cell support component is normally made by tape casting of a powder suspension and the active layers (cathode, electrolyte and anode) are subsequently deposited onto the support by spray painting or screen printing, with intermediate sintering steps for the different layers.

Alternatively SOFC's are for instance manufactured by electrochemical vapour deposition (CVD) method or plasma spraying. However, said processes are very expensive, and thus there has been a desire to lower the fabrication costs.

Consequently, when a planar SOFC is designed, one emphasis is to minimize sealing and sealing surfaces because the seal requirements are very stringent. Suitable high-temperature sealants being used include cements, glasses and glass-ceramics. A sealant selected for planar SOFC's must have sufficient stability in oxidizing and reducing environments, chemical compatibility with cell-stack components, and proper sealing and insulating properties. Examples of glass and glass-ceramic sealants being developed for planar SOFC's are modified borosilicate and aluminosilicate glasses.

US-A-200400115503 discloses an electrochemical device assembly, comprising a porous electrically conductive support layer; a prefabricated electrochemical device layer; and a bonding layer between said support layer and said electrochemical device layer. Also disclosed is a method of fabricating said assembly, said method comprising: providing a porous electrically conductive support layer; providing a prefabricated electrochemical device layer; and bonding said support layer and said electrochemical device layer with a bonding layer.

U.S. Pat. No. 6,458,170 relates to a method for fabricating a bilayer structure consisting of a porous substrate with a bonded dense film, comprising the steps of: forming a homogeneous porous substrate layer and curing it to a predetermined green density, applying by means of an aerosol spray a uniform suspension of a film material in a volatile carrier onto the surface of said substrate to form a thin green film layer of a predetermined thickness, volatilizing said carrier, and firing the bilayer formed by said green film layer and said substrate layer to sinter thin green film layer and substrate, said substrate having a predetermined green density selected such that the total shrinkage of the fired green film layer and fired substrate layer is such that the film shrinkage is equal to or less than that of the fired substrate.

Y. Matus et al., "Metal-supported solid oxide fuel cell membranes for rapid thermal cycling", Solid State Ionics, 176 (2005), 443-449, relates to SOFC membranes, in which zirconia-based electrolyte thin films are supported by a porous composite metal/ceramic current collector and are subjected to rapid thermal cycling between 200° C. and 800° C.

U.S. Pat. No. 6,843,960 discloses a method of making metal or metal alloy plates, comprising the steps of: obtaining a powder of a predefined composition, adding solvents, dispersants, a plasticizer and an organic binder to said powder to form a slip; forming said slip into a layer on a substrate; forming an additional layer directly on said layer and forming a plurality of additional layers directly on previous layers to provide a multiple layer graded stack in a defined order; heating said multiple layer graded stack to a predefined temperature for burning out said binder; and sintering said layer in a reducing atmosphere at a set temperature for a predetermined duration.

US-A-20030232230 relates to a SOFC repeat unit comprising a multilayer laminate, said multilayer laminate including a metallic air flow field; a metallic interconnect disposed on said metallic air flow field; a metallic fuel flow field disposed on said metallic interconnect; an anode disposed on said metallic fuel flow field, and an oxide electrolyte disposed on said anode. The obtained sintered repeating units are stacked in order to form a SOFC, and the stack is afterwards sintered and sealed.

WO 03/075382 teaches a solid oxide fuel cell of the type including repetitively stacked anode, electrolyte, cathode and interconnect layers including a plurality of gasket elements which space apart the interconnect, electrolyte, and gasket elements also defining integral manifolds for the fuel and oxidant inlet and exhaust flow streams.

GB-A-2400723 discloses an intermediate-temperature solid oxide fuel cell, comprising a ferritic stainless steel substrate including a coarsely porous support and a non-porous frame housing said porous support, a first electrode layer located in the non-porous frame and supported internally by the coarsely porous support, an electrolyte layer located over the first electrode layer, and a second electrode layer located over the electrolyte layer.

US-A-20020048699 relates to a SOFC, comprising a ferritic stainless steel substrate including a porous region and a non-porous region bounding the porous region; a ferritic stainless steel bi-polar plate located under one surface of the porous region of the substrate and being sealingly attached to the non-porous region of the substrate about the porous region thereof; a first electrode layer located over the other surface of the porous region of the substrate; an electrolyte layer located over the first electrode layer; and a second electrode layer located over the electrolyte layer.

WO 02/09116 discloses a SOFC of the type including repetitively stacked anode, electrolyte, cathode and interconnect layers including a plurality of gasket elements which space apart the interconnect and electrolyte elements and bound to the anode and cathode elements. The interconnect, electrolyte and gasket elements also define integral manifolds for the fuel and oxidant inlet and exhaust flow streams.

U.S. Pat. No. 6,248,468 describes a process for obtaining a fuel cell, including the steps of providing a pre-sintered nickel-zirconia fuel electrode, and an air electrode with a ceramic electrolyte disposed between the electrodes. The fuel electrode is sintered to provide an active solid oxide fuel cell.

U.S. Pat. No. 5,908,713 relates to a method of forming a fuel electrode on an electrolyte of a SOFC by a sintering process, the method comprising the provision of an underlayer to which an electrolyte is applied in the form of a slurry, which is then dried. An overlayer is thereafter applied to the underlayer and then dried. The dried underlayer and overlayer are then sintered to form the fuel electrode.

However, there are a number of disadvantages with the designs and manufacturing procedures of SOFC stacks hitherto known:
1. True monolithic planar stacks are not obtained since the mechanical integrity of the stacks requires a permanent mechanical load to maintain sealing and electrical contact during operation.
2. The manufacturing processes are complicated and comprise numerous sintering steps or expensive chemical or physical deposition techniques.
3. In the case of sintering of the electrodes, there are two drawbacks:
   a. Due to the required sintering temperatures, performance limiting interface reactions are often observed between the electrodes and the electrolyte and/or interconnect;
   b. During sintering it is not possible to maintain sufficient fine microstructures in the electrode and in the electrode/ electrolyte interface due to excessive grain growth.

SUMMARY

In view of the disadvantages of the processes so far known in the art it is the object of the present invention to provide a SOFC monolithic stack and a method for producing such a solid oxide fuel cell stack with improved mechanical stability and high electrical performance, while the process is cost effective. The so produced stack is intended for operation in the temperature range from 450-850° C. The stack may also be operated in reverse, functioning as an electrolyser (Solid Oxide Electrolyser Cells, SOECs) in which case the operational temperature may be higher. Furthermore, the stack is capable of working under pressurized conditions, such as conditions characteristic of gasturbine plants.

Said object is achieved by a reversible SOFC monolithic stack comprising:
1) a first component which comprises at least one porous metal containing layer (1) with a combined electrolyte and sealing layer (4) on the porous metal containing layer (1); wherein the at least one porous metal containing layer hosts an electrode;
2) a second component comprising at least one porous metal containing layer (1) with a combined interconnect and sealing layer (5) on the porous metal containing layer (1); wherein the at least one porous metal containing layers hosts an electrode.

Said object is further achieved by a method for preparing a reversible monolithic solid oxide fuel cell stack, comprising the steps of:
  providing a first component which comprises at least one porous metal containing layer (1);
  applying an electrolyte layer (4) on the at least one porous metal containing layer (1) of the first component;
  providing a second component comprising at least one porous metal containing layer (1);
  applying an interconnect layer (5) on the at least one porous metal containing layer (1) of the second component;
  stacking at least two of said first components and second components in an alternate order such that the electrolyte layer (4) of the first component contacts the surface of the second component being opposite to the surface of the second component which is covered with the interconnect layer (5);
  sintering the stack; and
  forming anodes and cathodes from the porous metal containing layers of the first and second components by impregnating the layers with electrode material.

The present invention furthermore provides a method for preparing a reversible solid oxide fuel cell stack, comprising the steps of:
  providing a first component which comprises at least one porous metal containing layer (1), wherein at least one layer is an electrode layer;
  applying an electrolyte layer (4) on said electrode layer;
  sintering the first component under reducing conditions;
  applying a sealing layer and/or spacer layer and an electrode layer on top of said electrolyte layer (4) of the first component;
  providing a second component comprising at least one porous metal containing layer (1), wherein at least one layer is an electrode layer;
  applying an interconnect layer (5) on said porous metal containing layer;
  sintering the second component under reducing conditions;
  applying a sealing and/or spacer layer and a contact layer on the top of said interconnect layer (5) of the second component;
  stacking at least two of said first components and second components in an alternate order; and
  sealing/bonding the stack.

The present invention also provides a method for preparing a reversible solid oxide fuel cell stack, comprising the steps of:
  providing a base component which comprises an electrolyte layer (11) and at least one porous metal containing layer (12), wherein at least one porous metal containing layer (12) is an electrode layer;
  forming the base component into a tube;
  applying a sealing layer on the ends of said base component;

sintering the tube-shaped component;
welding an interconnector onto the tube;
forming anodes and/or cathodes from the porous layers by impregnating the metal layer with electrode material;
stacking the tube-like components.

The present invention finally provides a reversible solid oxide fuel cell stack, obtainable by the above methods.

Preferred embodiments are set forth in the subclaims.

DETAILED DESCRIPTION OF THE INVENTION

In the following, the invention will be described in more detail.

First Embodiment

The first embodiment of the present invention is directed to a method for preparing a flat plate design SOFC stack with an external manifolding, and to a SOFC monolithic stack obtainable therewith.

The stack is made up of two components. The first component comprises at least one porous metal-containing layer 1. Preferably, the first component comprises at least two porous metal-containing layers 1 and 2, and more preferred the component comprises at least three porous metal-containing layers 1, 2 and 3. The component has a graded, porous structure. The grading is made by combining a number of layers which can be varied with respect to the composition, such as metal; electrolyte-metal; porosity, such as filler elements, the addition of tubes/fibers which burn away during sintering; and layer thickness. The thicknesses of layer 1 and 2 are in the range of about 20-70 μm and more preferably about 30-40 μm. The thickness of layer 3 is in the range of about 200-1000 μm, preferably about 300-700 μm, and more preferably about 400-500 μm.

Figure 1:
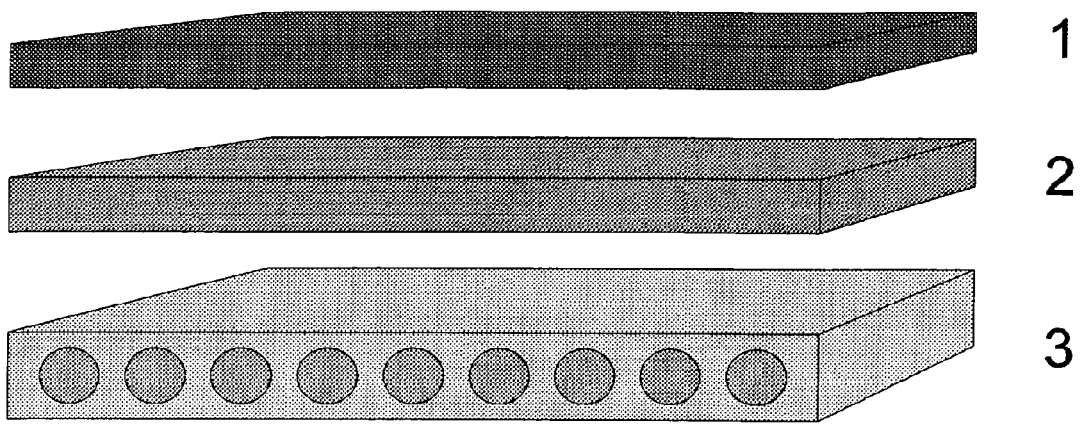
FIG. 1 illustrates the first component in accordance with the present invention, having three porous metal-containing layers 1, 2 and 3.

In FIG. 1, a first component having three porous metal-containing layers 1, 2 and 3 is shown. Layer 1 has the lowest porosity. An electrolyte material is added to the least porous layer to improve bonding with the electrolyte. The component of FIG. 1 further has a layer 2 having a medium porosity below the electrode layer, followed by a layer 3 having a high porosity.

The porosity of layer 1 is from about 20-70%, preferably from about 30-60% and more preferably from about 40-50%. The average pore size is from about 0.5-5 μm, preferably from about 0.5-3 μm and more preferably from about 1-2 μm. If the first and/or second component comprises more than one metal-containing layer, the porosity of layer 2 is from about 30-70 µm, and the porosity of layer 3 is from about 30-80 µm. The average pore size is about 2-4 µm and about 3-10 µm, respectively. Porosity and pore sizes are measured by mercury intrusion (Hg-porosimetry).

Figure 2:
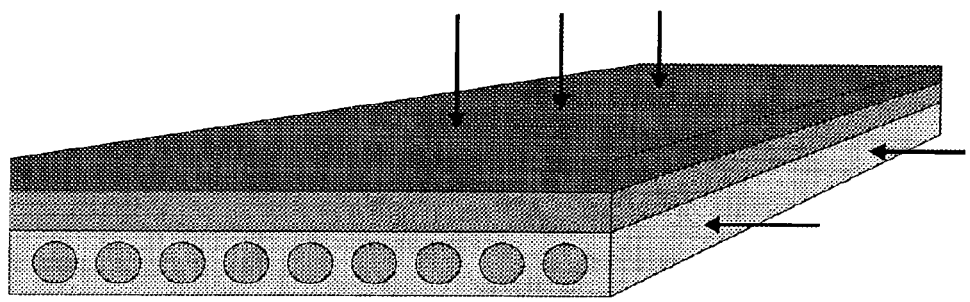
FIG. 2 is a view of the first/second component in accordance with the present invention, prior to applying an electrolyte/interconnect layer 4, 5. The arrows indicate the surfaces to be covered on the first component.

All layers may be manufactured by tape casting. The slurries from which the tapes are cast contain the materials in powder form, to which binders, surfactants, solvents, various organic additives and other auxiliary components may be added. The ingredients may be ball-milled together and then tape-cast into the respective layers, for example with a doctor blade system. The layers are then laminated together to form a first component, as shown in FIG. 2. Preferred additives for the suspensions for tape-casting are surfactants such as polyvinyl pyrrolidone (PVP), binders such as polyvinyl butyral (PVB), and solvents such as a mixture of ethanol and methylethylketone (EtOH+MEK).

The material for the porous metal containing layers 1, 2, 3, is selected from the group of $Fe_{1-x-y}Cr_xMa_y$ alloy, wherein Ma is Ni, Ti, Ce, Mn, Mo, W, Co, La, Y, or Al, and or NiO+metal oxides such as $TiO_2$ or $Cr_2O_3$. The layers may also contain doped ceria or doped zirconia. Suitable dopants are Sc, Y, Ce, Ga, Sm, Gd, Ca and/or any Ln element, or combinations thereof. Preferred dopants for zirconia are Sc or Y. A preferred dopant for ceria is Gd. Ln=lanthanides.

The average grain size ($d_{50}$) for the metal powder is typically in the range of about 3-25 µm and more preferably in the range of about 7-15 µm. The average grain size for the oxide powders is in the range of about 0.05 to 5 µm and more preferably about 0.1-1 µm.

After lamination an electrolyte layer 4 is sprayed at least on top of the first component. It may also be applied to the sides thereof, as shown in FIG. 2. In case the first component comprises at least two porous metal containing layers 1, 2 having a different porosity, the layer with the lowest porosity of the at least two layers is the layer on which the electrolyte layer 4 is applied.

Preferably, a barrier layer 9 may also be added prior to spraying the electrolyte on at least the top. The barrier layer 9 may be formed from doped ceria. Suitable dopants are Sc, Y, Ce, Ga, Sm, Gd, Ca and/or any Ln element, or combinations thereof. Preferably, the layer has a thickness of from about 0.1 to about 1 µm. The barrier layer 9 prevents interface reactions between the electrolyte and electrode.

The second component comprises at least one porous, metal containing layer 1, preferably at least two porous metal containing layers 1 and 2, and more preferably at least three porous metal containing layers 1, 2 and 3. The layers of the second component correspond to the layers of the first component described above. An interconnect layer 5 is applied at least on top of the metal containing layer. If the second component comprises at least two porous metal containing layers 1, 2 having a different porosity, the layer with the highest porosity of the at least two layers is the layer on which the interconnect layer 5 is applied. It may also be applied to the sides thereof, as shown in FIG. 2.

Figure 3:
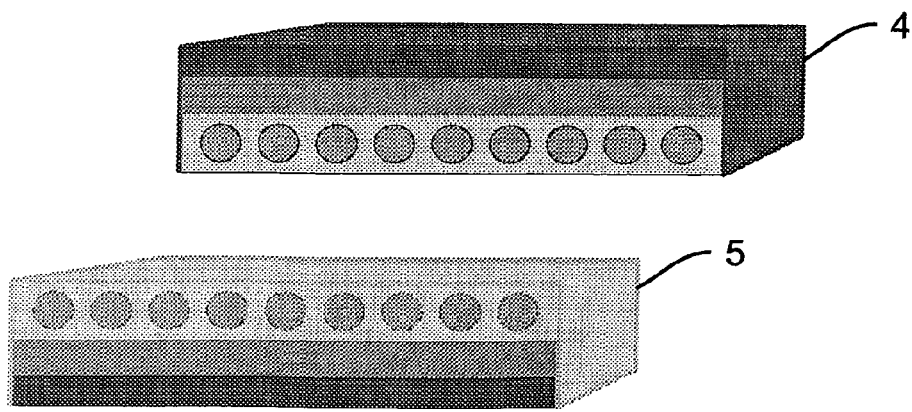
FIG. 3 illustrates the first and second component in accordance with the present invention, with an electrolyte/interconnect layer 4, 5 already applied.

FIG. 3 illustrates the first and the second component after an electrolyte layer 4 and an interconnect layer 5 have been applied thereon, respectively.

An alternative procedure comprises the lamination of a dense foil, such as a Fe22Cr foil, with the above mentioned layers. In this case the dense foil is laminated on the layer 3 side and suspensions are only sprayed on the edges of the base component. Fe22Cr comprises about 22% by weight of Cr, optionally small amounts of additives, and Fe for balance.

Furthermore, it is in some cases preferred to add sintering promotors/inhibitors to one or more of the above layers in order to control and match the shrinkage profiles during sintering.

Figure 4:
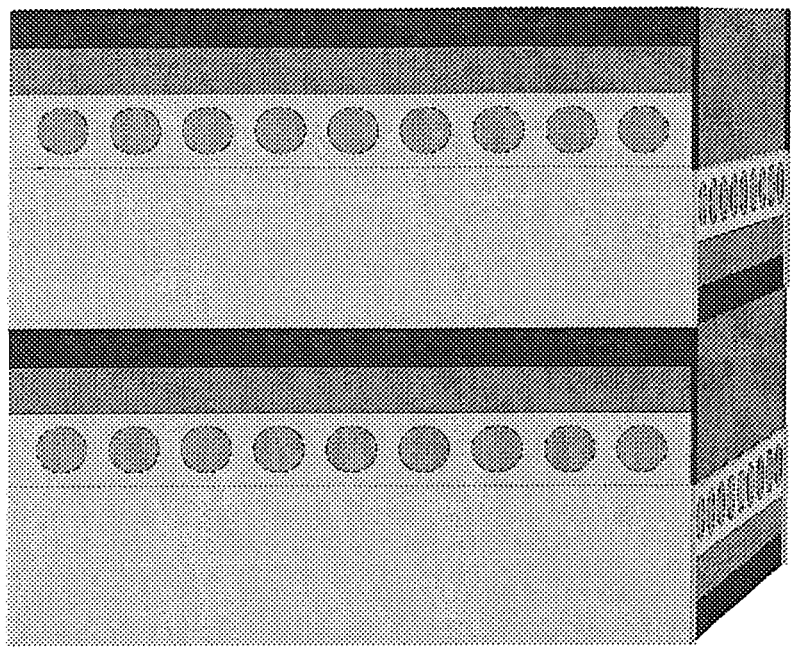
FIG. 4 illustrates the formation of a stack of alternate first and second components in accordance with the present invention.
Figure 5:
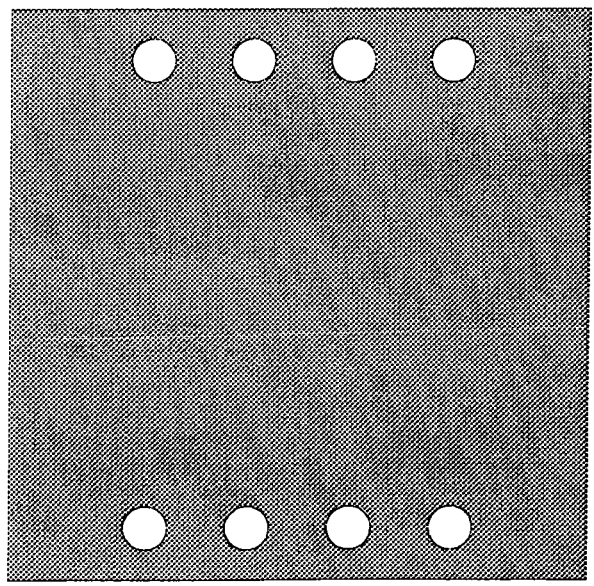
FIG. 5 illustrates the first component in accordance with the present invention after the formation of internal gas distribution holes for a cross flow design.

The tapes are then cut into suitable lengths, for example with a knife or by laser cutting. The first components and second components are stacked in an alternate order such that the electrolyte layer of the first component contacts the surface of the second component being opposite to the surface of the second component which is covered with the interconnect layer 5, as shown in FIG. 4. If the first and second components are as described above, wherein the top and also the sides of the component are covered with an electrolyte/interconnect layer, and then cut into suitable lengths, only two opposing sides of the first and second components are covered with the electrolyte/interconnect layer. In this case, the first and second components are stacked such that the second component is turned 90°, as shown in FIG. 5. Preferably, the stack is then hot pressed.

The thus obtained stack is sintered under reducing conditions at a temperature of preferably from about 900° C. to about 1500° C. The sintering procedure for the flat plate design comprises a vertical load on the stack of 50-250 g/cm². The stack is heated at an increase of about 20-50° C./h to about 500° C.C under flowing air. After 1-10 hours dwell time, the furnace is evacuated and $H_2$ introduced. After 2-10 hours dwell time, the furnace is heated with a temperature increase in the range of about 50-100° C./h to the sintering temperature and left for 1-10 hours before cooling to room temperature. In some cases more than one sintering temperature may be used. For instance 2 hours at 1100° C. followed by 4 hours at 1250° C.

After sintering of the stack, the electrodes are impregnated. In case of the cathode impregnation, the cathode gas distribution channels are used. In case the components have more than one layer, due to the graded porosity, the capillary forces will tend to move the cathode material into the most dense layer, the cathode layer. The infiltration is preferably performed more than one time. Further, preferably nitrates are used as the starting materials, in which case an intermediate heating step is employed for the decomposition of the nitrates, which provides more space for the next impregnation, since the volume of oxides are less than that of the nitrates.

Suitable materials for forming the cathode by impregnation include a material selected from the group of LSM ($La_{1-x}Sr_x$)$MnO_{3-\delta}$, ($Ln_{1-x}Sr_x$)$MnO_{3-\delta}$, ($Ln_{1-x}Sr_x$)$Fe_{1-y}Co_yO_{3-\delta}$, ($Y_{1-x}Ca_x$)$Fe_{1-y}Co_yO_{3-\delta}$, ($Gd_{1-x}Sr_x$)$Fe_{1-y}Co_yO_{3-\delta}$, ($Gd_{1-x}Ca_x$)$Fe_{1-y}Co_yO_{3-\delta}$, (Y,Ca)$Fe_{1-y}Co_yO_{3-\delta}$, doped ceria, and doped zirconia, or mixtures thereof. Ln=lanthanides.

δ in the above formulae is a number for the oxygen deficiency in the lattice and is dependant on composition and the actual oxygen partial pressure (as $pO_2$ decreases δ will increase). The number will typically be between 0 and about 0.3.

As described for the cathode impregnation, the anode is impregnated accordingly. Suitable materials for forming the anode by impregnation include a material selected from the group of Ni, Ni—Fe alloy, doped ceria, and doped zirconia, or mixtures thereof. The dopants are the same as mentioned earlier. Alternatively $Ma_sTi_{1-x}Mb_xO_{3-\delta}$, Ma=Ba, Sr, Ca; Mb=V, Nb, Ta, Mo, W, Th, U; $0 \leq s \leq 0.5$; or $LnCr_{1-x}M_xO_{3-\delta}$, M=T, V, Mn, Nb, Mo, W, Th, U may be used as anode materials.

Instead of tape casting individual layers and subsequently laminating them together as described above, the first layer may be tape cast and after drying additional layers may be tape cast on top of the first layer. Alternatively, the individual layers may be rolled from a paste, followed by lamination of the layers. As another alternative, powder pressing may be applied to make the individual layers, followed by lamination. Prior to sintering the laminated layers may preferably be hot pressed.

The electrolyte/interconnect layers may be applied by spraying, as described above. Alternatively, screen-printing; electrophoretic deposition (EPD), possibly followed by isostatic pressing; or pulsed laser deposition (PLD) may be used.

Finally, external manifoldings are applied to the sides of the stack.

The reversible solid oxide fuel cell monolithic stack of the present invention is not only suitable to operate under ambient pressure, but may also advantageously be used under elevated pressure conditions, such as the pressure conditions characteristic of gas turbine plants. When, for example, gas turbines are combined with the SOFC stack of the present invention, very high electrical efficiencies larger than 60% are achieved. Some of the heat created by the SOFC stack can effectively be used for the electricity generation in a gas turbine, creating a synergy effect.

Furthermore, due to its true monolithic structure, the SOFC stack of the present invention tolerates anode and cathode side pressure differences, making it much easier to control and contributing to make the balance of the plant construction simpler and more cost effective, as compared to conventional designs.

In particular, the interconnect layers and the porous substrate layers form a backbone providing excellent stability of the monolithic structure.

Preferably, the SOFC stack can be used in a pressure range of up to elevated pressures of about 15 bar, more preferably 10 bar. Elevated pressure in the sense of the present invention is to be understood as being higher than ambient pressure at about 25° C.

The operation under elevated pressure conditions also has the advantage that the electromotive force of the cell (EMF) and hence the power output increases with increasing pressure. Additionally, an increase of the pressure on the cathode side reduces the cathode polarisation losses, also adding to the power increase and thus to the overall improvement in effectiveness.

Second Embodiment

The second embodiment of the present invention is directed to a method for preparing a flat plate design SOFC stack with an internal manifolding, and to a SOFC stack obtainable therewith.

Figure 6:
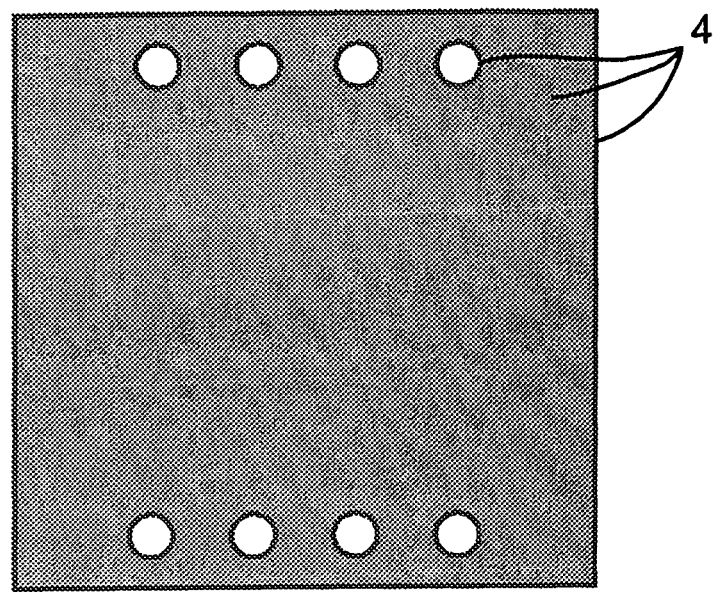
FIG. 6 illustrates the first component in accordance with the present invention with internal gas distribution holes after applying an electrolyte layer 4 thereon for a cross flow design.

In this case, the at least one porous metal containing layer 1 of the first component of the second embodiment corresponds to the one as described above for the first embodiment. In a first step, gas distribution holes are punched into opposite sides, as shown in FIG. 5. The diameter of the holes is typically about 5-7 mm, but may vary in the range of 1-10 mm. Next, the electrolyte layer 4 is deposited on top of the metal containing layer with the gas distribution holes in it. Thereby, the punched gas distribution holes and the four sides of the component are also sealed, as shown in FIG. 6.

Figure 7:
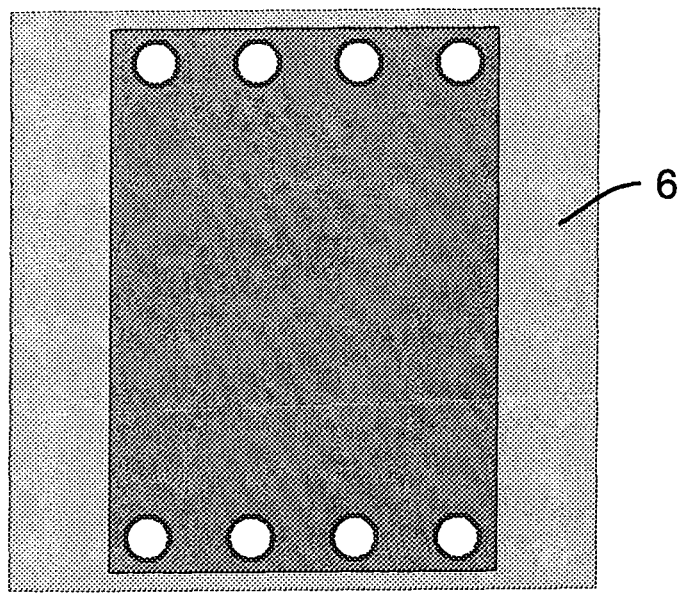
FIG. 7 illustrates the first component in accordance with the present invention with internal gas distribution holes after applying a sealing layer 6 thereon for a cross flow design.

Thereafter, a sealing layer 6 is deposited on the electrolyte layer 4, as shown in FIG. 7. The sealing layer 6 is a thin layer with a preferable thickness of about 20 μm, and comprises the interconnect material(s) already described above for the first embodiment. This step may be carried out by spraying or screen-printing. Alternatively a deformable ceramic and/or glass based seal may be used.

Figure 8:
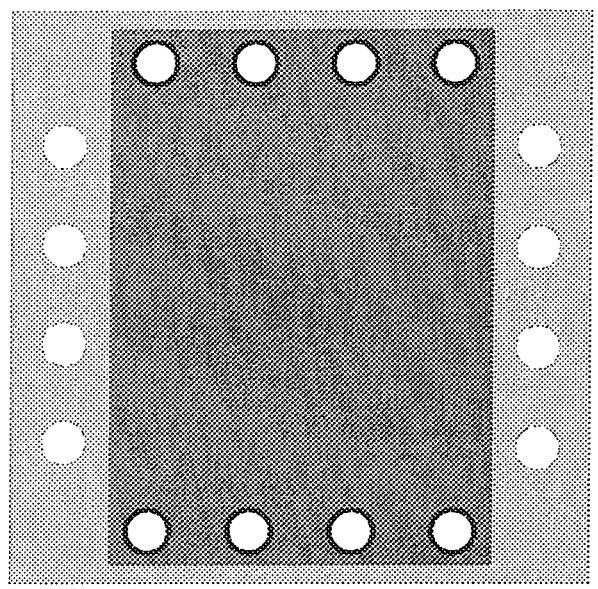
FIG. 8 illustrates the first component in accordance with the present invention after the formation of additional gas distribution holes for a cross flow design.

Afterwards, holes are punched in the two remaining sides of the first component, as shown in FIG. 8. These holes are unsealed at the edges, while the gas distribution holes formed earlier are sealed with the electrolyte layer 4. The gas distribution to the electrode layer below the electrolyte is effected through the unsealed holes.

The second component of the second embodiment is produced as described above for the first component of the second embodiment, with the only difference in applying an interconnect layer 5 instead of the electrolyte layer 4. The interconnect layer is deposited on the most porous part of the component. This is shown on FIG. 10-13.

Figure 9:
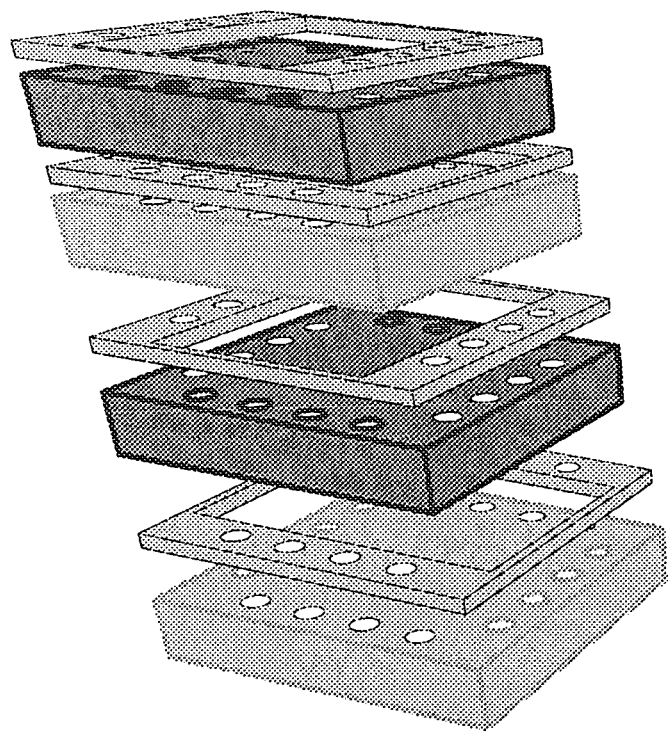
FIG. 9 illustrates the formation of a stack of alternate first and second components with internal gas distribution holes and spacer/sealing layer 6 in accordance with the present invention for a cross flow design.
Figure 10:
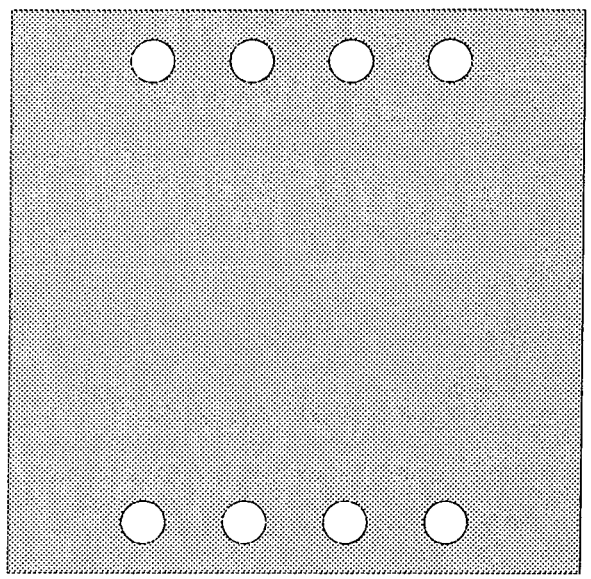
FIG. 10 illustrates the second component in accordance with the present invention after the formation of internal gas distribution holes for a cross flow design.
Figure 11:
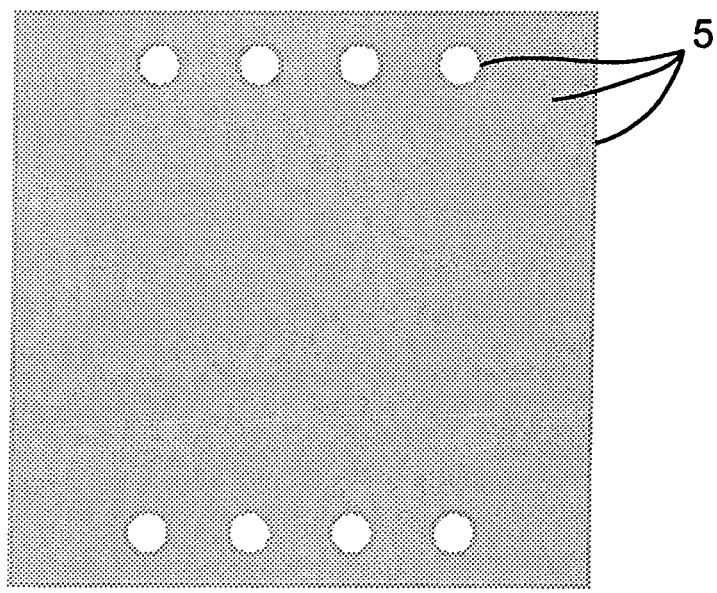
FIG. 11 illustrates the second component in accordance with the present invention with internal gas distribution holes after applying an interconnect layer 5 thereon for a cross flow design.
Figure 12:
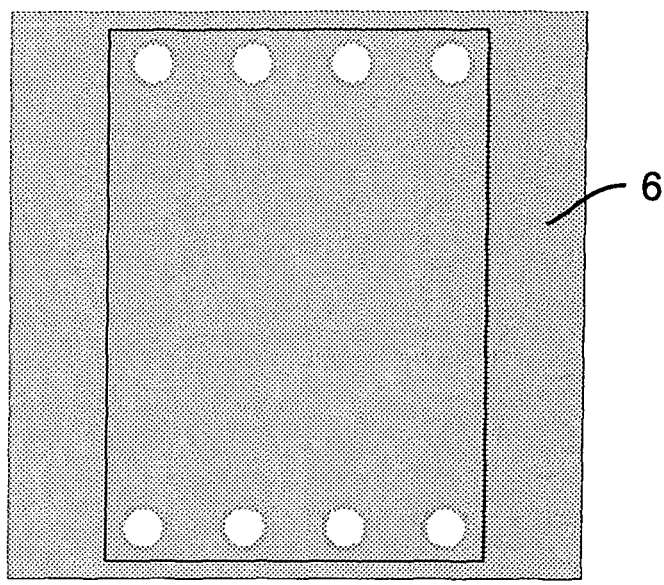
FIG. 12 illustrates the first embodiment in accordance with the present invention with internal gas distribution holes after applying a sealing layer 6 thereon for a cross flow design.
Figure 13:
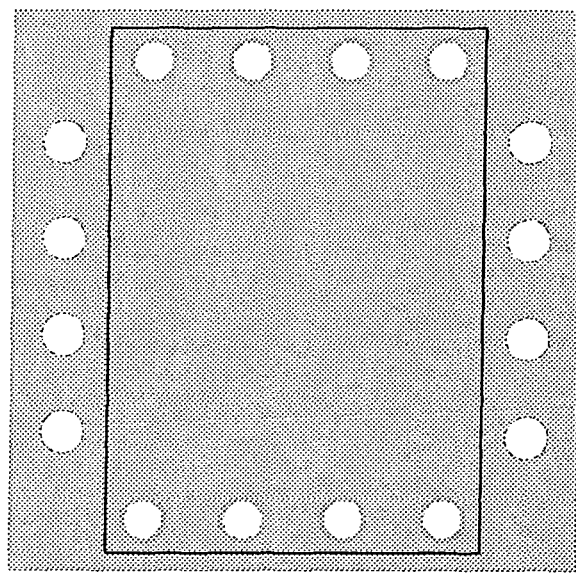
FIG. 13 illustrates the first component in accordance with the present invention after the formation of additional gas distribution holes for a cross flow design.

Next, the first and second components are stacked in an alternate order, again with the second component turned 90°, as shown in FIG. 9, and preferably hot pressed. In FIG. 9, the layer thicknesses are not shown in the correct relative scale. Instead, the sealing layer is very thin, as compared to the stack, so that the electrode layer of the interconnect component comes into a large area contact with the electrolyte from the electrolyte component. Likewise, the current collection/gas distribution layer of the electrolyte component comes into contact with the interconnect component.

Figure 15:
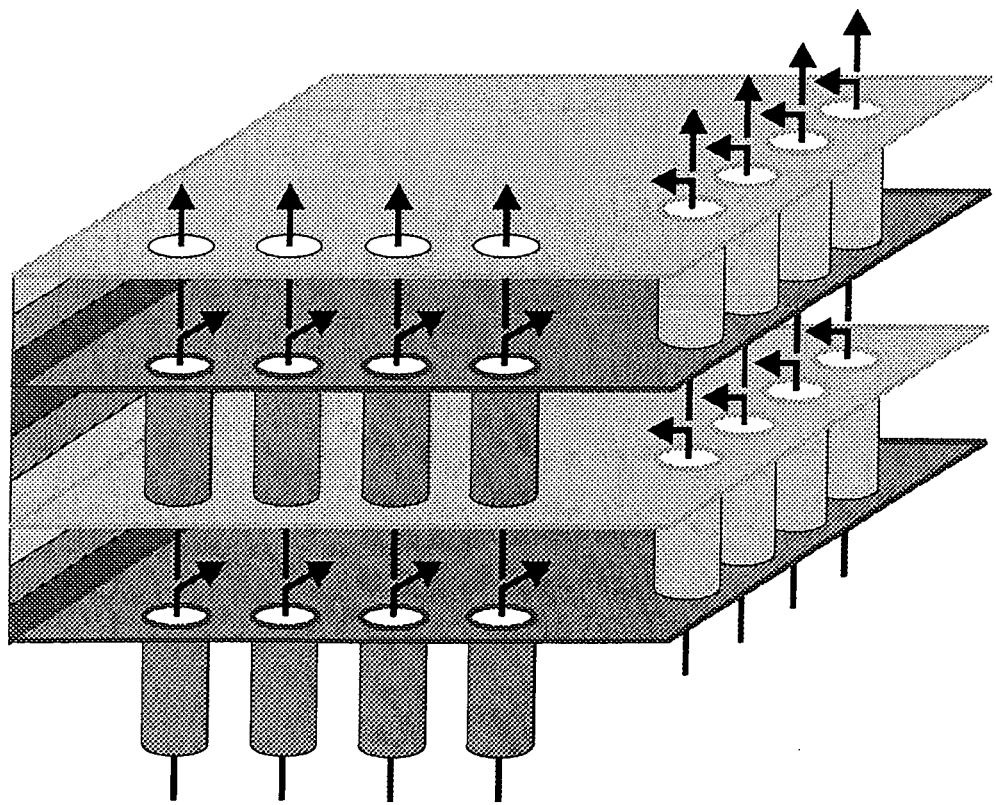
FIG. 15 illustrates the gas flow pattern for an internally manifolded cross flow design.

The flow distribution for a cross flow design is illustrated in FIG. 15.

The process described above results in a cross flow configuration. Should co- or counter-flow configurations be desired, this may be achieved by punching displaced gas distribution holes on the same opposite sides. This is illustrated in FIGS. 16-19 for the first component. The second component is manufactured accordingly. A benefit of the co- or counter flow is that the cells do not need to be square.

After assembly of the stack, the four external sides of the stack may additionally be sealed by applying a ceramic or glass layer.

Next, the stack is sintered. After sintering the electrodes are impregnated, as described above for the first embodiment.

Third Embodiment

In this embodiment, the need for impregnation is lessened by (partial) formation of the anode and the cathode earlier in the process. Therefore, the first component of the third embodiment contains the anode material in the electrode layer. The first component is sintered under reducing conditions, after which a sealing layer 6 and/or contact layer 8 and a cathode layer are deposited. The cathode layer is preferably about 30 μm thick.

The second component of the third embodiment does not contain an electrode layer. After sintering, a sealing layer 6 and contact layer 8 are deposited.

The stack is assembled by stacking the first and second components in an alternate order, and sealing/bonding them at a low temperature of from about 600° C. to about 900° C., preferably of from about 650° C. to about 850° C.

In the third embodiment, the need for impregnation of the electrodes is considerably reduced. However, a catalyst may still be impregnated on the anode and/or cathode site if necessary. Suitable materials for the impregnation are the same as listed above for the first and second embodiment.

Fourth Embodiment

The fourth embodiment is directed to a tubular design SOFC stack and method for obtaining same.

In this case, the method for preparing the reversible solid oxide fuel cell stack comprises the steps of:

providing a base component which comprises an electrolyte layer 11 and at least one porous metal containing layer 1; wherein at least one porous metal containing layer is an electrode layer;

forming the base component into a tube;

applying a sealing layer on the ends of said base component;

sintering the tube-shaped component onto the tube;

welding an interconnector onto the tube;

forming anodes and/or cathodes from the porous layers by impregnating the metal layer with electrode material;

stacking the tube-like components.

The sintering is preferably carried out at a temperature of from about 900° C. to about 1500° C.

Further, the method preferably comprises the step of forming an electrode layer on the inner side of the tube-shaped component by impregnation after the sintering step. Furthermore, the outer side may be impregnated such that an electrode layer is formed.

Figure 22:
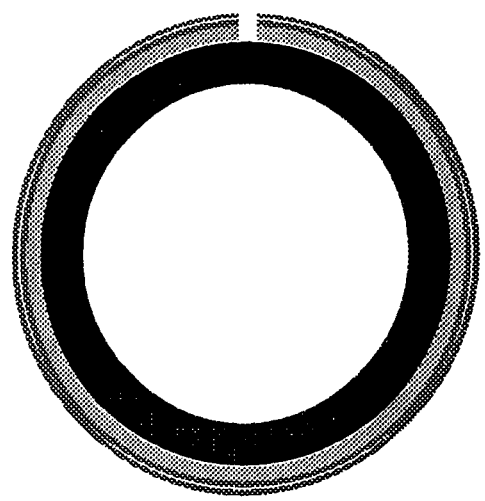
FIG. 22 illustrates the wrapping of the base component around a tube prior to sintering.
Figure 26:
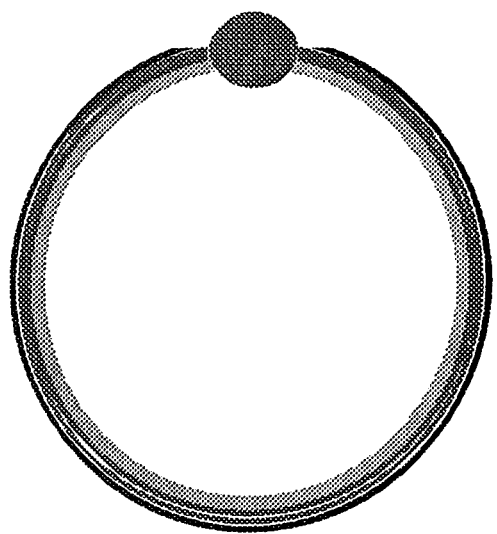
FIG. 26 illustrates the completed cell with a cathode layer.

In a preferred embodiment, the tube-shaped component is produced by rolling of an uncut laminate comprising at least an electrolyte layer 11 and a porous metal-containing electrode layer 12, and sealing the tube at the seam. FIG. 22 illustrates a tube formed by laminating and rolling. An outer electrode may be deposited on the tube-shaped component after rolling and sealing. Alternatively, the outer electrode may be deposited on the laminate prior to rolling and sealing. FIG. 26 illustrates a stack configuration.

According to the methods of the present invention which has been described in detail above with regard to specific embodiments, a monolithic stack is formed, based on a basic component made of one or more metal containing layers with varying porosity. The basic components with electrolyte or interconnect layers are fired together, creating a monolithic stack; only after said steps the electrodes are added by impregnation.

Some embodiments have been described with reference to only a square geometry, but the invention is of course not limited thereto. Other shapes, such as for example a circular geometry, may as well be applied, depending on the desired application of the stack.

In summary, the methods of the present invention as described in various embodiments above have numerous advantages:

1. The manufacturing process is simplified; a sealed monolithic stack is manufactured using only one sintering step;
2. The obtained stack has little or no glass sealing and consists predominantly of metal, making it very mechanically robust;
3. The stack can be delivered 'ready-to-use' as a single component;
4. Interface reactions between electrodes and electrolyte or interconnect and electrodes are prevented or limited by the impregnation after sintering of the porous structure/stack. This results in the formation of high surface area and thus high performing electrodes.
5. The process is very flexible;
6. The high metal content lowers the overall price of the stack;
7. The high metal content ensures that the current path through a stack is predominantly through metal, which has a high conductivity. This can make non-planar designs attractive, i.e. variants of tubular cells, even though the current paths are longer.
8. The obtained reversible solid oxide fuel cell monolithic stack is suitable to be used under pressurised conditions, such as in a gas turbine plant. Thereby, a combined cycle plant achieves very high electrical efficiencies and the plant can in addition be simplified.

In the following, the present invention will be further illustrated with reference to detailed examples. The invention is however not restricted thereto.

EXAMPLES

Example 1

Manufacture of a Monolithic Stack with External Manifolds

The first step comprises tape-casting of three metal containing layers (layers 1, 2 and 3, see FIG. 1). Suspensions for tape-casting are manufactured by means of ball milling of powders with polyvinyl pyrrolidone (PVP), polyvinyl butyral (PVB) and EtOH+MEK as additives. After control of particle size, the suspensions are tape-cast using a double doctor blade system and the tapes are subsequently dried.

Layer 1: The suspension comprises $Zr_{0.78}Sc_{0.2}Y_{0.02}O_{2-\delta}$ and Fe22Cr powder in a 1:2 volume ratio. The green thickness is in the range of 50-70 μm. The sintered porosity of the layer is about 50% with a pore size in the range of 1-2 μm.

Layer 2: The suspension is based on Fe22Cr powder using charcoal as a pore-former. The green thickness of the foil is 50-70 μm. The sintered porosity of the layer is about 50%, with an average pore size of about 4 μm.

Layer 3: The same alloy composition is used as for layer 2, but in this case with a larger grain size distribution. Cellulose and graphite fibers are used as pore-formers. The green thickness is about 500 μm. The sintered porosity of the layer is about 60% with an average pore size of about 10 μm.

The second step comprises the lamination of the above mentioned foils into the base component, as shown in FIG. 2. The lamination is performed by the use of heated rolls in a double roll set-up and takes place in one pass.

The third step comprises spray painting of a $Zr_{0.78}Sc_{0.2}Y_{0.02}O_{2-\delta}$ suspension on the surface (layer 1 side) and edges of the base component as shown in FIG. 2. The suspension is manufactured as described for the suspensions in step 1.

The fourth step is spray painting of a Fe22Cr suspension on the surface (layer 3 side) and edges of the base component, as shown in FIG. 2. The suspension is manufactured as described for the suspensions in step 1.

In the fifth step, the sprayed laminated tapes are cut into square pieces. This is done by knife punching resulting in sintered areas in the range of 12×12 to 20×20 $cm^2$.

The sixth step comprises the stacking of the two different components in an alternating order, as illustrated in FIG. 3.

In the seventh step, the stack is sintered. The stack is placed in a furnace under a vertical load of 150 $g/cm^2$. The stack is heated at an increase of about 50° C./h to about 500° C. under flowing air. After 2 hours of soaking, the furnace is evacuated and $H_2$ introduced. After 3 hours soaking time, the furnace is heated to about 1250° C. with a temperature increase of 100° C./h and left for 5 hours before cooling to room temperature.

The eighth step is the impregnation of the cathode. The sintered stack is closed on the two sides of the electrolyte sealed edges (see FIG. 4) by a rubber seal. A nitrate solution of Gd, Sr, Co and Fe is vacuum infiltrated into the porous structure. The infiltration is performed four times with an intermediate heating step for decomposition of the nitrates. The resulting composition of the impregnated perovskite cathode is: $(Gd_{0.6}Sr_{0.4})_{0.99}(Co_{0.2}Fe_{0.8})O_{2-\delta}$.

In the ninth step the anode is impregnated. The cathode impregnated stack is closed on the two sides of the interconnect sealed sides (see FIG. 4) by a rubber seal. A nitrate solution of Ni, Ce and Gd is vacuum infiltrated into the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

Thus, a monolithic stack ready to be installed in an SOFC system is obtained.

Example 2

Manufacture of a Monolithic Stack with External Manifolds (Thin Cell)

The first step comprises the tape-casting of three metal containing layers (layer 1, 2 and 3, see FIG. 1). Suspensions for tape-casting are manufactured by means of ball milling the powders with various organic additives such as surfactants, binders and solvents (see Example 1). After control of particle size distribution, the suspensions are tape-cast using a double doctor blade system, and the tapes are subsequently dried.

Layer 1: The suspension comprises $Zr_{0.78}Sc_{0.2}Y_{0.02}O_{2-\delta}$ and Fe22Cr powder in a 1:2 volume ratio. The green thickness is in the range of 30-40 µm. The sintered porosity of the layer is about 40%, with a pore size in the range of about 1-2 µm.

Layer 2: The suspension is based Fe22Cr powder using charcoal as a pore-former. The green thickness of the foil is 30-40 µm. The sintered porosity of the layer is about 40% with an average pore size of about 3 µm.

Layer 3: The same alloy composition is used as for layer 2, but in this case with a larger particle size distribution. Cellulose and graphite fibers are used as pore-formers. The green thickness is about 250 µm. The sintered porosity of the layer is about 50% with an average pore size of about 8 µm.

The second step is the lamination of the foils obtained in step 1 into the base component, as shown in FIG. 2. The lamination is performed by the use of heated rolls in one pass.

The third step is the manufacture of the first base component (see FIG. 3) by spray painting a $Zr_{0.78}Sc_{0.2}Y_{0.02}O_{2-\delta}$ suspension on the surface (layer 1 side) and edges of the base component, as shown in FIG. 2. The suspension is manufactured as described for suspensions in step 1. 0.25 wt % of $Al_2O_3$ is added as sintering agent.

The fourth step is the manufacture of the second base component (see FIG. 3) by spray painting a Fe22Cr suspension on the surface (layer 3 side) and edges of the base component. The suspension is manufactured as described for the suspensions in step 1.

In the fifth step the sprayed laminated tapes is cut into squared pieces. This is done by knife punching, resulting in pieces which, after sintering, are shaped in the range of about 12×12 to 20×20 cm².

The sixth step is stacking of the two different components obtained above in an alternating order, as illustrated in FIG. 3.

In the seventh step, the stack is sintered. The stack is placed in a furnace under a vertical load of 250 g/cm². The stack is heated at an increase of about 50° C./h to 500° C. under flowing air. After further 2 hours of soaking, the furnace is evacuated and $H_2$ is introduced. After further 3 hours of soaking, the furnace is heated to 1150° C. with a temperature increase of 100° C./h, and left for further 8 h before cooling to room temperature.

In the eighth step, the cathode is impregnated. The obtained sintered stack is closed on the two sides of the electrolyte sealed edges (see FIG. 4) by a rubber seal. A nitrate solution of Gd, Sr, Co and Fe is vacuum infiltrated into the porous structure. The infiltration is performed four times with an intermediate heating step for the decomposition of the nitrates. The resulting composition of the impregnated perovskite cathode is: $(Gd_{0.6}Sr_{0.4})_{0.99}(Co_{0.2}Fe_{0.8})O_{2-\delta}$.

The ninth step is the impregnation of the anode. The cathode impregnated stack is closed on the two sides of the interconnect sealed sides (see FIG. 4) by a rubber seal. A nitrate solution of Ni, Ce and Gd is vacuum infiltrated in to the porous structure. The infiltration is performed five times with intermediate heating between each infiltration so as to decompose the impregnated nitrates. The resulting composition of the impregnated anode part is 40 vol % Ni and 60 vol % $(Ce_{0.9}Gd_{0.1})O_{2-\delta}$ (after reduction of NiO).

The thus obtained stack is ready to be installed in an SOFC system.

Example 3

Manufacture of a Monolithic Stack with External Manifolds (Interconnect Foil)

The first step is carried out as described in Example 1.

The second step comprises the lamination of the foils manufactured in the first step into a base component, as shown in FIG. 2. The lamination is performed by the use of heated rolls in one pass.

The third step is the lamination of a base component hosting the interconnect. An U shaped dense Fe22Cr foil with a thickness of 50-100 pm is laminated together with the foils manufactured in first step. This component comprises thus four layers, with the dense FeCr foil laminated against layer 3. This process results in a second base component as indicated in FIG. 3, with the interconnect layer being thicker than shown in the Figure. The lamination is performed by the use of heated rolls in one pass.

The fourth step corresponds to the third step of Example 1.

The fifth step comprises the cutting of the laminated tapes obtained in the second step in square-shaped pieces having about the same size as described for the second base component manufactured in the third step. This cutting is done by knife punching.

The further manufacturing of the stack is then carried out as described in Example 1, steps 6-9.

The obtained stack is ready to be installed in an SOFC system.

Example 4a

Manufacture of a Monolithic Stack with Internal Manifolding and Cross Flow of Fuel and Oxidizing Gas The first step comprises the tape-casting of three metal containing layers (layer 1, 2 and 3, see FIG. 1). Suspensions for tape-casting are manufactured by means of ball milling of powders with various organic additives such as surfactants, binders and solvents (see Example 1). After control of the particle size distribution, the suspensions are tape-cast using a double doctor blade system, and the tapes are subsequently dried.

Layer 1: The suspension comprises $Zr_{0.78}Sc_{0.2}Y_{0.02}O_{2-\delta}$ and Fe22Cr powder in a 1:2 volume ratio. The green thickness is about 70 μm. The sintered porosity of the layer is 50% with a pore size in the range of about 1-2 μm.

Layer 2: The suspension is based Fe22Cr powder using charcoal as a pore-former. The green thickness of the foil is about 100 μm. The sintered porosity of the layer is 50-60% with an average pore size of about 4 μm.

Layer 3: The same alloy composition is used as for layer 2, but in this case a with larger particle size distribution. Cellulose and graphite fibers are used as pore-formers. The green thickness is about 400 μm. The sintered porosity of the layer is about 70% with an average pore size of about 10-15 μm.

In the second step, the above mentioned foils are laminated into the base component, as shown in FIG. 2. The lamination is performed by the use of heated rolls in one pass.

In the third step, holes are cut in the base component on two opposite sides (as shown in FIG. 5), followed by cutting the base component in smaller pieces. The process may be performed with either knife punching or laser cutting. The diameter of the holes is about 5-7 mm, and the size of the base component pieces are in the range of $12 \times 12$ to $20 \times 20$ cm$^2$ after sintering.

The fourth step is the manufacture of the first base component (see FIG. 3) by spray painting of a $Zr_{0.78}Sc_{0.2}Y_{0.02}O_{2-\delta}$ suspension on the surface (layer 1 side) and edges (outer edges and edges of holes) of the base component, as shown in FIG. 6. The suspension is manufactured as described for suspensions in step 1.

The fifth step is the deposition of a sealing layer on the edge area, as indicated in FIG. 7. The layer having a thickness in the range of about 10-20 μm is made by screen printing a Na—Al—SiO$_2$ glass ink. The ink is manufactured as described for suspensions in step 1.

The sixth step is the cutting of gas distribution holes on the two opposite sides, as illustrated in FIG. 8. Cutting is done as previously described.

The seventh step is the manufacture of the second base component (see FIG. 3) by spray painting of a Fe22Cr suspension on the surface (layer 3 side) and edges (outer edges and edges of holes) of the base component, as shown in FIG. 6. The ink is manufactured as described for the suspensions in step 1.

The eighth step is the deposition of a sealing layer on the edge area. The area is marked in FIG. 7. The layer that has a thickness in the range of about 10-20 μm is made by screen printing a Fe22Cr ink. The ink is manufactured as described for the suspensions in step 1.

The ninth step is the cutting of gas distribution holes on the two opposite sides, as illustrated in FIG. 8. Cutting is done as previously described.

The tenth step is the stacking of the two different components in an alternating order, as illustrated in FIG. 9.

In the eleventh step, the stack is sintered. The stack is placed in a furnace under a vertical load of 100 g/cm$^2$. The stack is then heated at a temperature increase of about 50° C./h to 500° C. under flowing air. After further 2 hours of soaking, the furnace is evacuated and H$_2$ introduced. After further 3 hours of soaking, the furnace is heated to 1300° C. with a temperature increase of about 100° C./h and left for 5 hours before cooling to room temperature.

The twelfth step is the impregnation of the cathode. The in- and outlets to the anode compartment are closed by a rubber seal. A nitrate solution of Gd, Sr, Co and Fe is vacuum infiltrated into the porous structure. The infiltration is performed four times with an intermediate heating step for decomposition of the nitrates. The resulting composition of the impregnated perovskite cathode is: $(Gd_{0.6}Sr_{0.4})_{0.99}(Co_{0.2}Fe_{0.8})O_{2-\delta}$.

The thirteenth step is the impregnation of the anode. The in- and outlets to the cathode compartment are closed by a rubber seal. A nitrate solution of Ni, Ce and Gd is vacuum infiltrated in to the porous structure. The infiltration is performed five times with an intermediate heating schedule between each infiltration for decomposition of the impregnated nitrates. The resulting composition of the impregnated anode part is 40 vol % Ni and 60 vol % $(Ce_{0.9}Gd_{0.1})O_{2-\delta}$ (after reduction of NiO).

The thus obtained stack is ready to be installed in an SOFC system.

Example 4b

Figure 14:
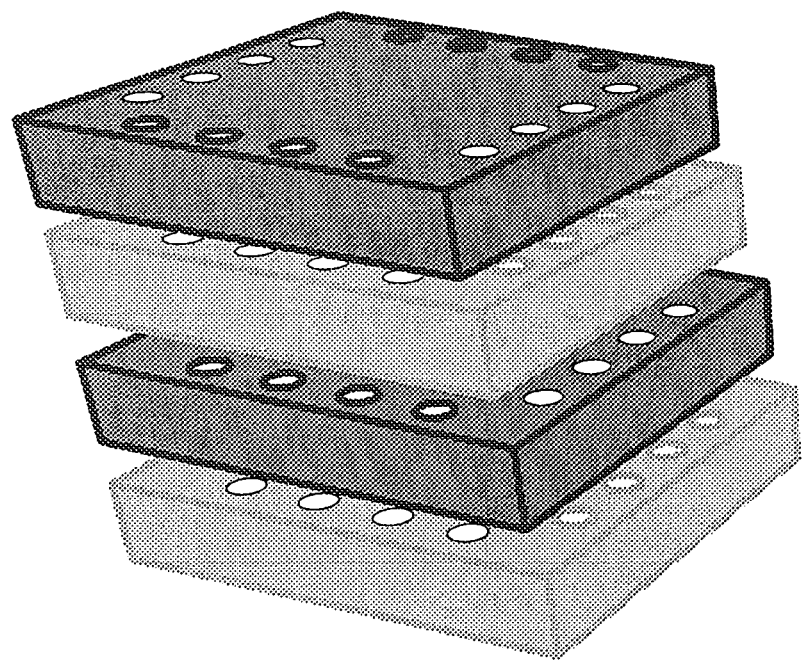
FIG. 14 illustrates the formation of a stack of alternate first and second components with internal gas distribution holes without a sealing layer in accordance with the present invention for a cross flow design.

Manufacture of a Monolithic Stack with Internal Manifolding and Cross Flow of Fuel and Oxidizing Gas The stack is manufactured as described in Example 4a, but step five and eight (deposition of sealing layer) is omitted, as illustrated in FIG. 14.

Example 4c

Manufacture of a Monolithic Stack with Internal Manifolding and Cross Flow of Fuel and Oxidizing Gas The stack is manufactured as described in Example 4a or 4b, additionally having an outer seal applied on to the sides of the stack, which is applied prior to sintering of the stack. The seal is applied by spray painting.

Example 5

Manufacture of a Monolithic Stack with Internal Manifolding and Co- or Counter-Flow of Fuel and Oxidizing Gas The first and second steps are carried out as described in Example 3.

Figure 16:
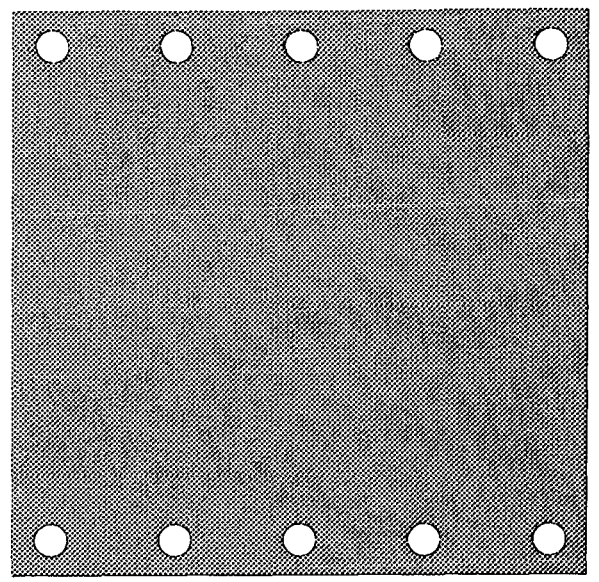
FIG. 16 illustrates the first component in accordance with the present invention after the formation of internal gas distribution holes for a co/counter flow design.

The third step is the cutting of gas distribution holes in the base component on two opposite sides (as shown in FIG. 16) as well as cutting the base component in smaller pieces. The process may be performed with either knife punching or laser cutting. The diameter of the holes is typically about 5-7 mm. and the size of the base component pieces is in the range of about $12 \times 12$ to $20 \times 20$ cm$^2$ after sintering.

Figure 17:
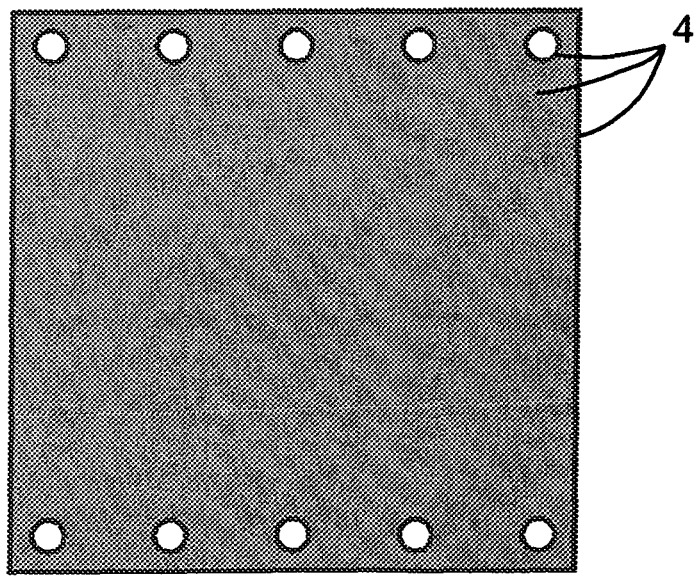
FIG. 17 illustrates the first component in accordance with the present invention with internal gas distribution holes after applying an electrolyte layer thereon for a co/counter flow design.

The fourth step is the manufacture of the first base component (see. FIG. 3) by screen printing of a $Zr_{0.78}Sc_{0.2}Y_{0.02}O_{2-\delta}$ ink on the surface (layer 1 side) and edges (outer edges and edges of holes) of the base component, as shown in FIG. 17. The ink is manufactured as described for the suspensions in step 1.

Figure 18:
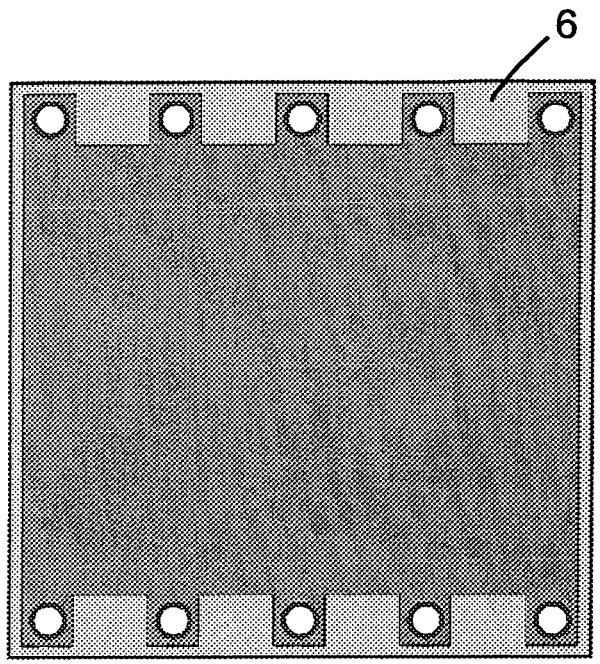
FIG. 18 illustrates the first embodiment in accordance with the present invention with internal gas distribution holes after applying a sealing layer 6 thereon for a co/counter flow design.

The fifth step is the deposition of a sealing layer 6 on the edge area and area between holes made in the third step. The layer having a thickness in the range of about 10-20 μm is made by screen printing a Ca—Al—SiO$_2$ glass ink, as shown in FIG. 18. The ink is manufactured as described for the suspensions in step 1.

The sixth step is the cutting of gas distribution holes between the holes made in the third step. Cutting is done as described previously.

The seventh step is the manufacture of the second base component (see FIG. 3) by screen printing of a Fe22Cr ink on the surface (layer 3 side) and edges (outer edges and edges of holes) of the base component. The ink is manufactured as described for the suspensions in step 1.

The eighth step is the deposition of a sealing layer on the edge area of the component produced in the seventh step. The layer that has a thickness in the range of 10-20 μm is made by screen printing a Fe22Cr ink. The ink is manufactured as described for the suspensions in step 1.

Figure 19:
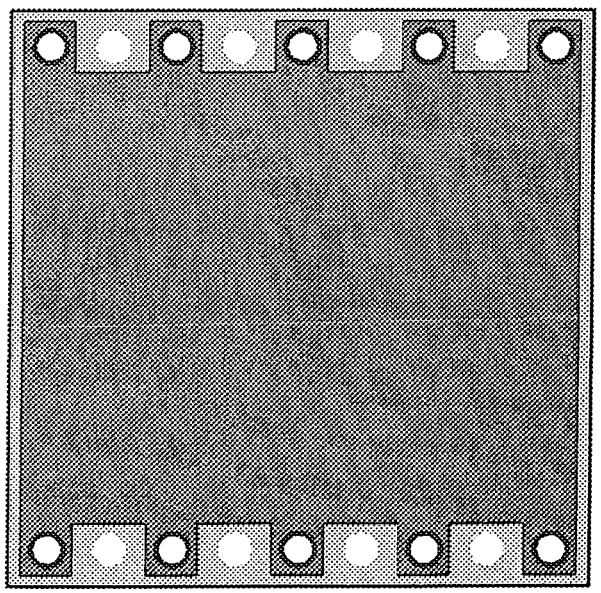
FIG. 19 illustrates the first component in accordance with the present invention after the formation of additional gas distribution holes for a co/counter flow design.

The ninth step is the cutting of gas distribution holes between the holes made in the third step (see FIG. 19). Cutting is done as described previously.

Figure 20:
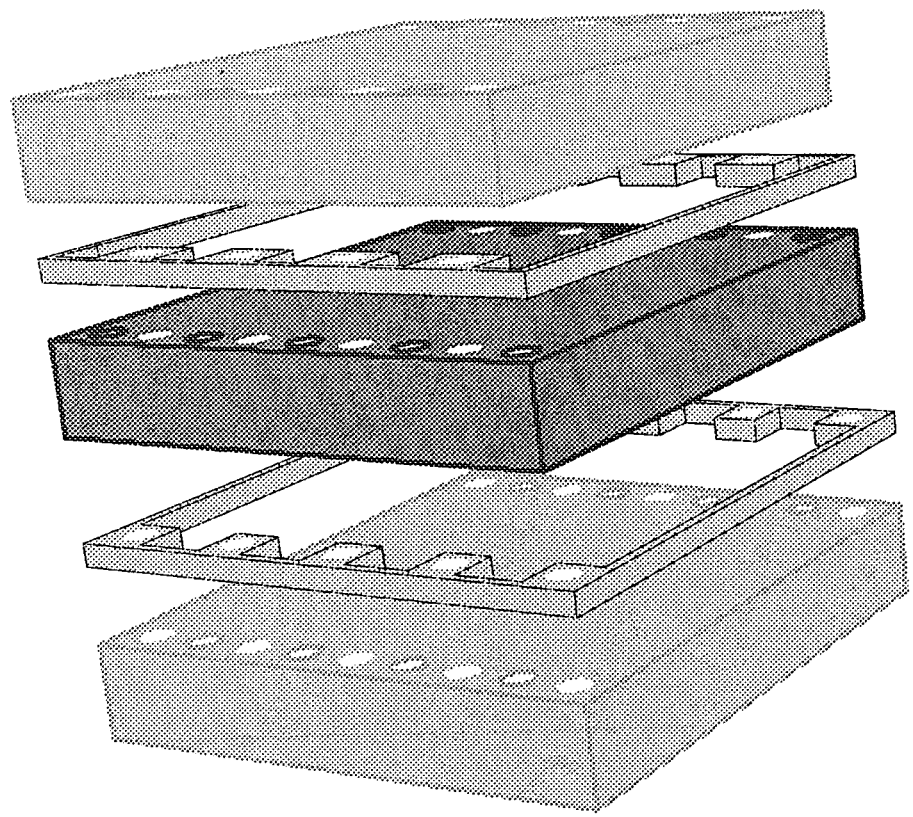
FIG. 20 illustrates the formation of a stack of alternate first and second components with internal gas distribution holes and spacer/sealing layers in accordance with the present invention for a cross flow design.

The tenth step is the stacking of the two different components in an alternating order, as illustrated in FIG. 20.

The eleventh step is the sintering of the stack. The stack is placed in a furnace under a vertical load of 50-250 g/cm². The stack is heated with a temperature increase of about 50° C./h to 500° C. under air flow. After further 2 hours of soaking, the furnace is cooled to room temperature and a metallic titanium sponge is introduced into the furnace in front of the stack, the furnace is subsequently evacuated and $H_2$ introduced. The furnace is heated to 1300° C. with a temperature increase of about 100° C./h and left for further 3 hours before cooling to room temperature.

The twelfth step is the impregnation of the cathode. The in- and outlets to the anode compartment are closed by a rubber seal. A colloid suspension of 60 vol % $(Gd_{0.6}Sr_{0.4})_{0.99}(Co_{0.2}Fe_{0.8})O_{2-\delta}$ and 40 vol % $(Ce_{0.9}Gd_{0.1})O_{2-\delta}$ is vacuum infiltrated into the porous structure. The infiltration is performed four times with an intermediate heating step.

The thirteenth step is the impregnation of anode. The in- and outlets to the cathode compartment are closed by a rubber seal. A nitrate solution of Ni, Ce and Gd is vacuum infiltrated in to the porous structure. The infiltration is performed five times with an intermediate heating schedule between each infiltration for decomposition of the impregnated nitrates. The resulting composition of the impregnated anode part is 45 vol % Ni and 55 vol % $(Ce_{0.9}Gd_{0.1})O_{2-\delta}$ (after reduction of NiO).

The resulting stack is ready to be installed in an SOFC system.

Example 6

Manufacture of a Monolithic Stack with External Manifolding and Partial Impregnation of the Electrode The first step is the tape-casting of four metal containing layers (layer 1, 2, 3, and 4). The suspensions for tape-casting are manufactured by means of ball milling of powders with various organic additives such as surfactants, binders and solvents. After control of particle size distribution, the suspensions are tape-cast using a double doctor blade system, and the tapes are subsequently dried. The composition of the suspensions is adjusted so that the desired porosity as well as sintering shrinkage is achieved.

Layer 1: The suspension comprises 55 wt % NiO and 45 wt % $Zr_{0.78}Sc_{0.2}Y_{0.02}O_{2-\delta}$. PMMA spheres are used as a pore former. The green thickness is around about 50 μm. The sintered porosity of the layer is about 50%, with a pore size in the range of about 1-2 μm.

Layer 2: The suspension comprises $Zr_{0.78}Sc_{0.2}Y_{0.02}O_{2-\delta}$ and Fe22Cr powder in a 1:2 volume ratio. Charcoal is used as a pore-former. The green thickness of the foil is 50-70 μm. The sintered porosity of the layer is about 50%, with an average pore size of about 4 μm.

Layer 3: The suspension is based on Fe22Cr powder using charcoal as a pore-former. The green thickness of the foil is 50-70 μm. The sintered porosity of the layer is about 55%, with an average pore size of about 4 μm.

Layer 4: The same alloy composition as for layer 3 is used, but in this case with a larger particle size distribution. Cellulose and graphite fibers are used as pore-formers. The green thickness is about 300 μm. Sintered porosity of the layer is about 60%, with an average pore size of about 10 μm.

The second step is the manufacturing of the first base component by lamination of the foils manufactured in step 1. The lamination of the foils is in the order of layer 1, 2, 3 and 4 and is performed by the use of heated rolls.

The third step is the deposition of the electrolyte on the base component made in the second step by spray painting a $Zr_{0.78}Sc_{0.2}Y_{0.02}O_{2-\delta}$ suspension on the surface (layer 1 side) and edges of the base component, as indicated in FIG. 2. The suspension is manufactured as described for the suspensions in step 1.

The fourth step is the cutting of the sprayed laminated tapes in squared pieces. This is done by knife punching, resulting in piece dimensions after sintering in the range of 12×12 to 20×20 cm².

The fifth step is the sintering of the first base component obtained in steps 2-4. The sintering is carried out as described in the seventh step of Example 1.

The sixth step is the coating of the sintered electrolyte on the first base component with a ceria barrier layer. The layer is deposited by spin coating of a nitrate solution of Ce and Gd. The resulting composition is $(Ce_{0.9}Gd_{0.1})O_{2-\delta}$.

The seventh step is the manufacturing of the second base component by lamination of foils 2-4 obtained in step 1. The lamination of the foils is in the order of layers 2, 3 and 4, and is performed by the use of heated rolls.

The eighth step is the deposition of the interconnect on the base component obtained in the sixth step by spray painting of a Fe22Cr suspension on the surface (layer 4 side) and edges of the base component, as indicated in FIG. 2. The suspension is manufactured as described for the suspensions in step 1.

The ninth step is the cutting of the sprayed laminated tapes into squared pieces. This is done by knife punching, resulting in piece sizes after sintering in the range of 12×12 to 20×20 cm².

The tenth step is the sintering of the second base component obtained in steps 6-8. The sintering is done as described in the seventh step of Example 1.

The eleventh step is the deposition of a Ca—Al—$SiO_2$ based ink on the outer 5 mm on each side of the interconnect sealed side on the second base component.

The twelfth step is the deposition of a cathode layer on the layer 2 side of the second base component. The cathode layer that comprises a 1:1 volume mixture of $(La_{0.6}Sr_{0.4})_{0.99}(Co_{0.2}Fe_{0.8})O_{2-\delta}$ and $(Ce_{0.9}Gd_{0.1})O_{2-\delta}$ is deposited by screen printing. The screen printing is carried out as previously described.

The thirteenth step is the stacking of the two different base components in an alternating order.

The fourteenth step is the sealing and bonding of the stack by heat treatment at 850° C. for 2 hours in air. The stack is subjected to a vertical load of 50 g/cm² prior to the heat treatment.

The fifteenth step is the impregnation of NiO into the anode compartment by vacuum infiltration of Ni-nitrate solution.

The resulting stack is ready to be installed in an SOFC system.

Example 7

Manufacture of a Monolithic Stack with External Manifolding and Partial Impregnation of the Electrode

Example 7 basically corresponds to Example 6, with the exception that layer 1 in step 1 is manufactured with a mixture of a non-nickel containing anode material and Fe22Cr.

The resulting stack is ready to be installed in an SOFC system.

Example 8

Manufacture of a Tubular Cell Stack

The first step is the tape-casting of an electrolyte layer and two metal containing layers. The suspensions for tape-casting are manufactured by means of ball milling the powders with various organic additives such as surfactants, binders and solvents. After control of particle size distribution, the suspensions are tape-cast using a double doctor blade system and the tapes are subsequently dried. The composition of the suspensions is adjusted so that the desired porosity as well as sintering shrinkage is achieved.

Layer 11: The suspension comprises $Zr_{0.78}Sc_{0.2}Y_{0.02}O_{2-\delta}$. The green thickness is in the range of 20-25 µm. The layer is sintered to >96% of theoretical density.

Layer 12: The suspension comprises $Zr_{0.78}Sc_{0.2}Y_{0.02}O_{2-\delta}$ and Fe22Cr powder in a 1:2 volume ratio. The green thickness is in the range of 50-70 µm. Sintered porosity of the layer is 50% with a pore size in the range of about 1-2 µm.

Layer 13: The same alloy composition as for layer 12 is used, but in this case with larger particle size distribution. Cellulose and graphite fibers are used as pore-formers. The green thickness is about 400 µm. The sintered porosity of the layer is about 60% with an average pore size of about 10 µm.

Figure 21:
FIG. 21 illustrates the base component in accordance with the present invention, having two porous metal containing layers 12, 13 and one dense non metal containing electrolyte layer 11 (A). Alternatively the base component may comprise 4 layers as seen in (B) where a porous metal containing layer 14 is deposited on top of the electrolyte layer 11.
Figure 21:

The second step is the manufacturing of the base component by lamination of the foils manufactured in step 1. The lamination of the foils is in the order of layer 11, 12 and 13, as illustrated in FIG. 21, and is performed by the use of heated rolls.

The third step is the cutting of the base component into a sheet with the dimensions of about 77×300 mm².

The fourth step is the wrapping of the base component around an yttria stabilized zirconia tube with an outer diameter of about 25 mm (see FIG. 22).

Figure 23:
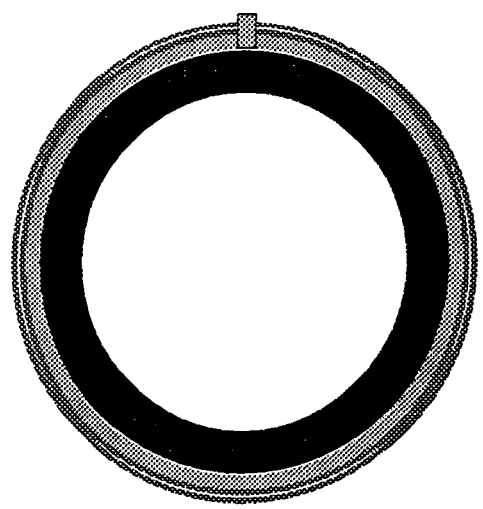
FIG. 23 illustrates the filling of the gap between the ends of the base component.

The fifth step is the filling of the gap between the ends of the sheet with a paste comprising Fe22Cr powder (see FIG. 23).

Figure 24:
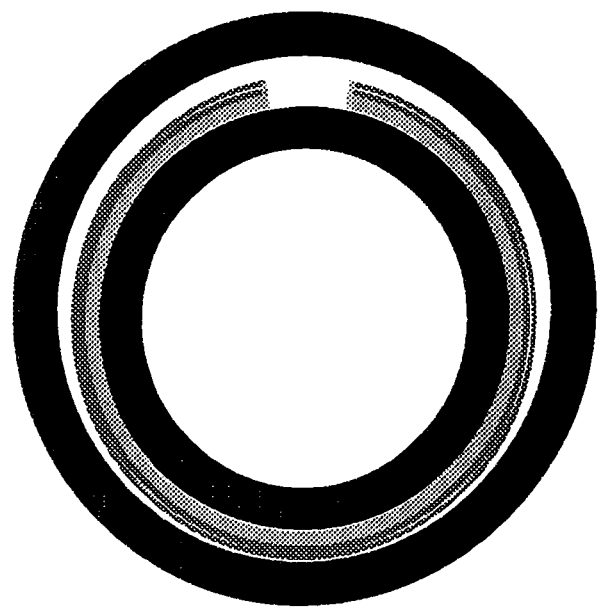
FIG. 24 illustrates the cell after sintering (the cell is inserted in a tube during sintering).

The sixth step is inserting the wrapped tube into a larger support tube made from yttria stabilized zirconia (see FIG. 24).

The seventh step is sintering under reducing conditions, as described in the seventh step of Example 1.

Figure 25:
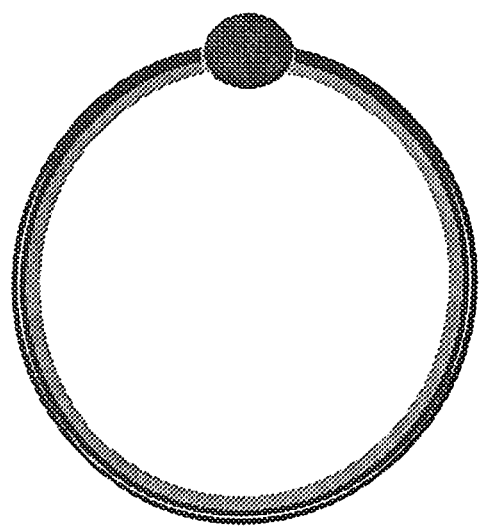
FIG. 25 illustrates the completed tubular cell after welding of an interconnector.

The eighth step is the welding of an interconnector rod to the tube, as illustrated in FIG. 25.

The ninth step is the impregnation of the anode into the porous layer on the inside of the tube. The impregnation is done by vacuum infiltration of Ni—, Ce—, Gd-nitrates, as described in the previous examples.

The tenth step is the depositing of a cathode by dip coating the tube into a slurry containing $(La_{0.6}Sr_{0.4})_{0.99}(Co_{0.2}Fe_{0.8})O_{2-\delta}$ and $(Ce_{0.9}Gd_{0.1})O_{2-\delta}$ in a 1:1 volume ratio, as illustrated in FIG. 26.

Figure 27:
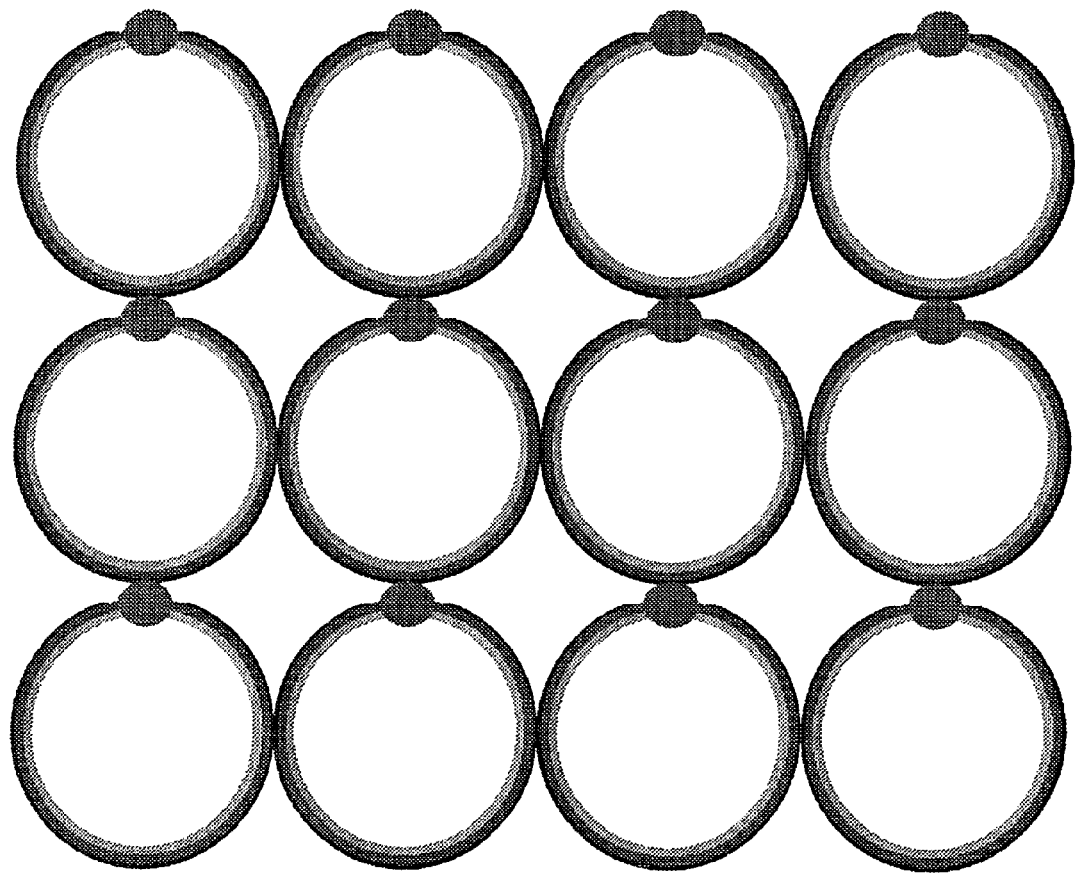
FIG. 27 illustrates a stack made from rolled tubular cells.

The eleventh step is bundling the single tubes into a stack, as illustrated is FIG. 27.

The resulting stack is ready to be installed in an SOFC system.

Example 9

Manufacture of a Tubular Cell Stack

The first step corresponds to the first step of Example 7.

The second step is the manufacturing of the base component by lamination of the foils manufactured in step 1. The lamination of the foils is in the order of layer 14, 11, 12 and 13 and is performed by the use of heated rolls (layer 14 may be similar to layer 12. Layer 14 is shorter than the other 3 layers so that the distance to the ends of the component after wrapping is more than about 3 mm, as illustrated in FIG. 21.

The third step is the cutting of the base component into a sheet with a dimension of 77×300 mm².

The fourth to eighth steps correspond to steps four to eight of Example 8.

The ninth step is the impregnation of the anode into the porous layer on the inside of the tube. The impregnation is done by vacuum infiltration of Ni—, Ce—, Gd-nitrates, as described in the previous examples.

The tenth step is the impregnation of the porous layer on the outside of the tube. The tube is closed in both ends and a colloidal suspension of about 60 vol % $(Gd_{0.6}Sr_{0.4})_{0.99}(Co_{0.2}Fe_{0.8})O_{2-\delta}$ and 40 vol % $(Ce_{0.9}Gd_{0.9}Gd_{0.1})O_{2-\delta}$ is impregnated by dipping the tube into said suspension.

The eleventh step is the bundling of the single tubes into a stack, as illustrated is FIG. 27.

The resulting stack is ready to be installed in an SOFC system.

It should be further apparent to those skilled in the art that various changes in form and detail of the invention as shown and described above may be made. It is intended that such changes be included within the spirit and scope of the claims appended hereto.

What is claimed is:

1. A method for preparing a reversible monolithic solid oxide fuel cell stack, comprising the steps of:
   (a) providing a first component which comprises at least three porous metal containing layers, each layer having a different porosity than the other two layers, wherein the three porous metal containing layers form a porous, graded structure, and wherein the porosity of the first porous metal containing layer is from 20 to 70%, the porosity of the second porous metal containing layer is from 30 to 70%, and the porosity of the third porous metal containing layer is from 30 to 80%;
   (b) applying an electrolyte layer on at least one porous metal containing layer of the first component;
   (c) providing a second component comprising at least three porous metal containing layers, each layer having a different porosity than the other two layers, wherein the three porous metal containing layers form a porous, graded structure, and wherein the porosity of the first porous metal containing layer is from 20 to 70%, the porosity of the second porous metal containing layer is from 30 to 70%, and the porosity of the third porous metal containing layer is from 30 to 80%;
   (d) applying an interconnect layer on the at least three porous metal containing layers of the second component;
   (e) stacking at least two of said first component and said second component in an alternate order such that the electrolyte layer of the first component contacts the surface of the second component being opposite to the surface of the second component which is covered with the interconnect layer, wherein the at least two of said first component and second component are in an unsintered state;
(f) sintering the stack; and
(g) forming anodes and cathodes from the most dense of the at least three porous metal containing layers of the first and second components by impregnating the layers with electrode material,
wherein the at least three porous metal containing layers of the first and second component comprise a $Fe_{1-x-y}Cr_x Ma_y$ alloy, wherein Ma is Ni, Ti, Ce, Mn, Mo, W, Co, La, Y or Al, and doped ceria or doped zirconia, and wherein the method comprises a single sintering step.

2. The method of claim 1, wherein the sintering step is carried out at a temperature from about 900° C. to about 1500° C.

3. The method of claim 1, wherein the material for forming the anode by impregnation is selected from (i) Ni; (ii) Ni—Fe alloy; (iii) doped ceria; (iv) doped zirconia, (v) $Ma_sTi_{1-x}Mb_xO_{3-\delta}$, wherein Ma is Ba, Sr, or Ca; Mb is V, Nb, Ta, Mo, W, Th, or U; and s ranges from 0 to 0.5; (vi) $LnCr_{1-x}Mb_xO_{3-\delta}$, wherein M is T, V, Mn, Nb, Mo, W, Th, or U; and (vii) mixtures thereof.

4. The method claim 1, wherein the material for forming the cathode by impregnation is selected from $(La_{1-x}Sr_x)MnO_{3-\delta}$, $(Ln_{1-x}Sr_x)MnO_{3-\delta}$, $(Ln_{1-x}Sr_x)Fe_{1-y}Co_yO_{3-\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Ca_x)Fe_{1-y}Co_yO_{3-\delta}$, $(Y,Ca)Fe_{1-y}Co_yO_{3-\delta}$, doped ceria, doped zirconia, and mixtures thereof.

5. The method of claim 1, wherein a barrier layer is applied to (i) at least one porous metal containing layer of the first component prior to applying the electrolyte layer thereon, (ii) at least one porous metal containing layer of the second component opposite to the interconnect layer, or (iii) both (i) and (ii).

6. The method of claim 1, wherein the electrolyte layer is applied to the layer with the lowest porosity of the at least three layers.

7. The method of claim 1, wherein the interconnect layer is applied to the layer with the highest porosity of the at least three layers.

8. The method of claim 1, wherein the first component and second component are punched on two opposite sides prior to application of the electrolyte layer or the interconnect layer such that gas distribution holes are formed in the first and second components.

9. The method of claim 8, wherein a sealing layer is deposited on the first and second components after the formation of the electrolyte layer or the interconnect layer thereon.

10. The method of claim 9, wherein the two remaining sides of the first component and the second component are punched after the application of the sealing layer such that gas distribution holes are formed in the first and second components.

11. The method of claim 9, wherein additional holes are punched in between the gas distribution holes already punched on the two opposite sides.

12. The method of claim 10, wherein the sealing layer comprises an electrode layer or a contact layer.

13. A reversible solid oxide fuel cell stack, obtainable by the method of claim 1.

14. The method of claim 2, wherein the material for forming the anode by impregnation is selected from (i) Ni; (ii) Ni—Fe alloy; (iii) doped ceria; (iv) doped zirconia; (v) $Ma_sTi_{1-x}Mb_xO_{3-\delta}$, wherein Ma is Ba, Sr, or Ca; Mb is V, Nb, Ta, Mo, W, Th, or U; and s ranges from 0 to 0.5; (vi) $LnCr_{1-x}M_xO_{3-\delta}$, wherein M is V, Mn, Nb, Mo, W, Th, or U; and (vii) mixtures thereof.

15. The method of claim 14, wherein the material for forming the cathode by impregnation is selected from $(La_{1-x}Sr_x)MnO_{3-\delta}$, $(Ln_{1-x}Sr_x)MnO_{3-\delta}$, $(Ln_{1-x}Sr_x)Fe_{1-y}Co_yO_{3-\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Ca_x)Fe_{1-y}Co_yO_{3-\delta}$, $(Y,Ca)Fe_{1-y}Co_yO_{3-\delta}$, doped ceria, doped zirconia, and mixtures thereof.

16. The method of claim 15, wherein a barrier layer is applied to (i) at least one of the at least three porous metal containing layers of the first component prior to applying the electrolyte layer thereon, (ii) at least one of the at least three porous metal containing layer layers of the second component opposite to the interconnect layer, or (iii) both (i) and (ii).

17. The method of claim 16, wherein the electrolyte layer is applied to the layer with the lowest porosity of the at least three layers.

18. The method of claim 17, wherein the interconnect layer is applied to the layer with the highest porosity of the at least three layers.

19. The method of claim 16, wherein the interconnect layer is applied to the layers with the highest porosity of the at least three layers.

20. The method of claim 16, wherein the first component and the second component are punched on two opposite sides prior to application of the electrolyte layer or the interconnect layer such that gas distribution holes are formed in the first and second components.

21. The method of claim 17, wherein the first component and the second component are punched on two opposite sides prior to application of the electrolyte layer of the interconnect layer such that gas distribution holes are formed in the first and second components.

22. The method of claim 18, wherein the first component and the second component are punched on two opposite sides prior to application of the electrolyte layer or the interconnect layer such that gas distribution holes are formed in the first and second components.

23. The method of claim 11, wherein the sealing layer comprises an electrode layer or a contact layer.

24. The method of claim 2, wherein the material for forming the cathode by impregnation is selected from $(La_{1-x}Sr_x)MnO_{3-\delta}$, $(Ln_{1-x}Sr_x)MnO_{3-\delta}$, $(Ln_{1-x}Sr_x)Fe_{1-y}Co_yO_{3-\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Ca_x)Fe_{1-y}Co_yO_{3-\delta}$, $(Y,Ca)Fe_{1-y}Co_yO_{3-\delta}$, doped ceria, doped zirconia, and mixtures thereof.

25. The method of claim 2, wherein a barrier layer is applied to (i) at least one of the at least three porous metal containing layers of the first component prior to applying the electrolyte layer thereon, (ii) at least one of the at least three porous metal containing layers of the second component opposite to the interconnect layer, or (iii) both (i) or (ii).

26. The method of claim 3, wherein a barrier layer is applied to (i) at least one of the at least three porous metal containing layers of the first component prior to applying the electrolyte layer thereon, (ii) at least one of the at least three porous metal containing layers of the second component opposite to the interconnect layer, or (iii) both (i) and (ii).

27. The method of claim 4, wherein a barrier layer is applied to (i) at least one of the at least three porous metal containing layers of the first component prior to applying the electrolyte layer thereon, (ii) at least one of the at least three porous metal containing layers of the second component opposite to the interconnect layer, or (iii) both (i) and (ii).

28. The method of claim 2, wherein the electrolyte layer is applied to the layer with the lowest porosity of the at least three layers.

* * * * *